Dec. 23, 1958  F. W. ROBERTS ET AL  2,865,637
SOUND RECORDING AND REPRODUCING APPARATUS
Filed Aug. 7, 1947  12 Sheets-Sheet 1
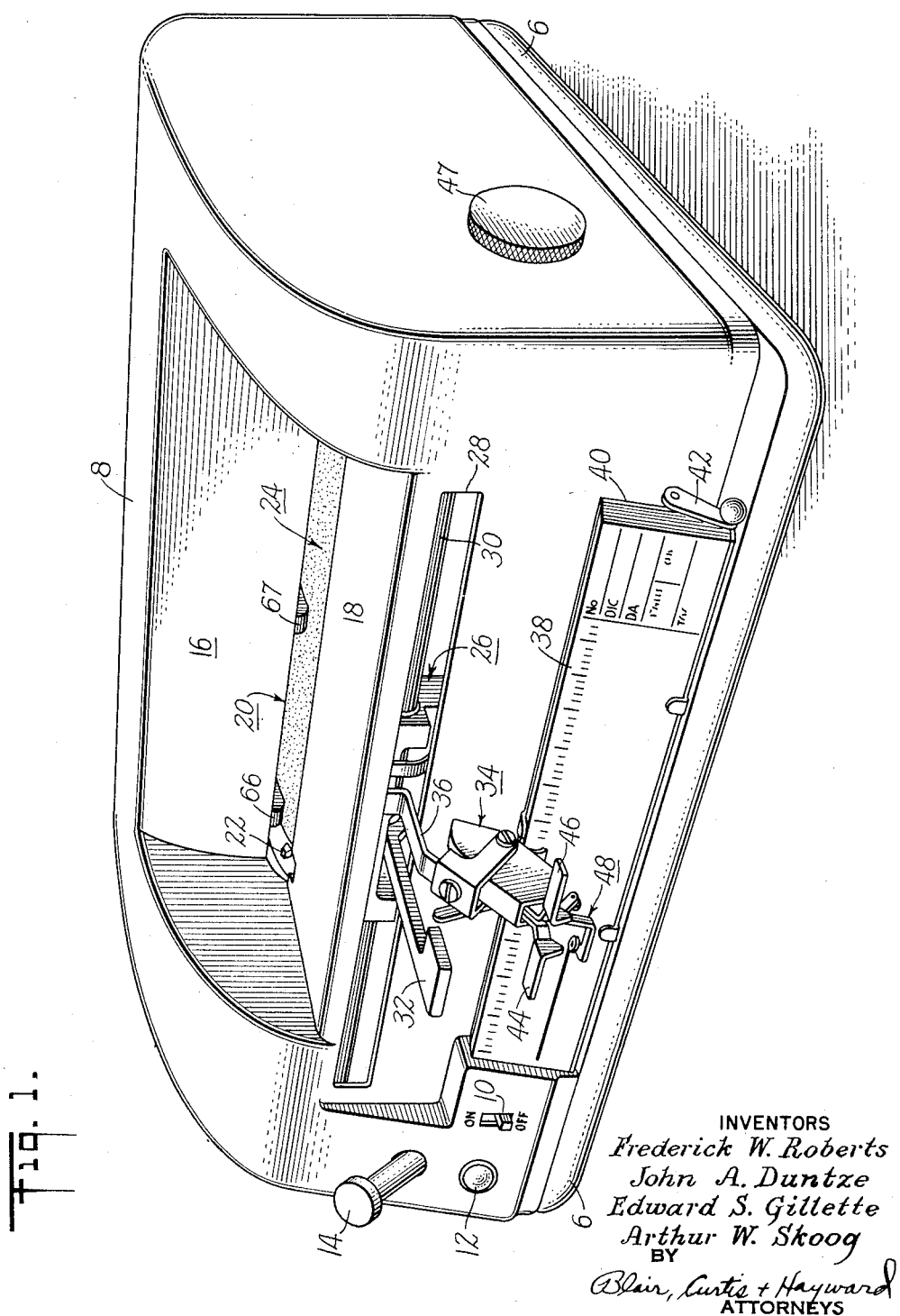
INVENTORS
Frederick W. Roberts
John A. Duntze
Edward S. Gillette
Arthur W. Skoog
BY
Blair, Curtis + Hayward
ATTORNEYS

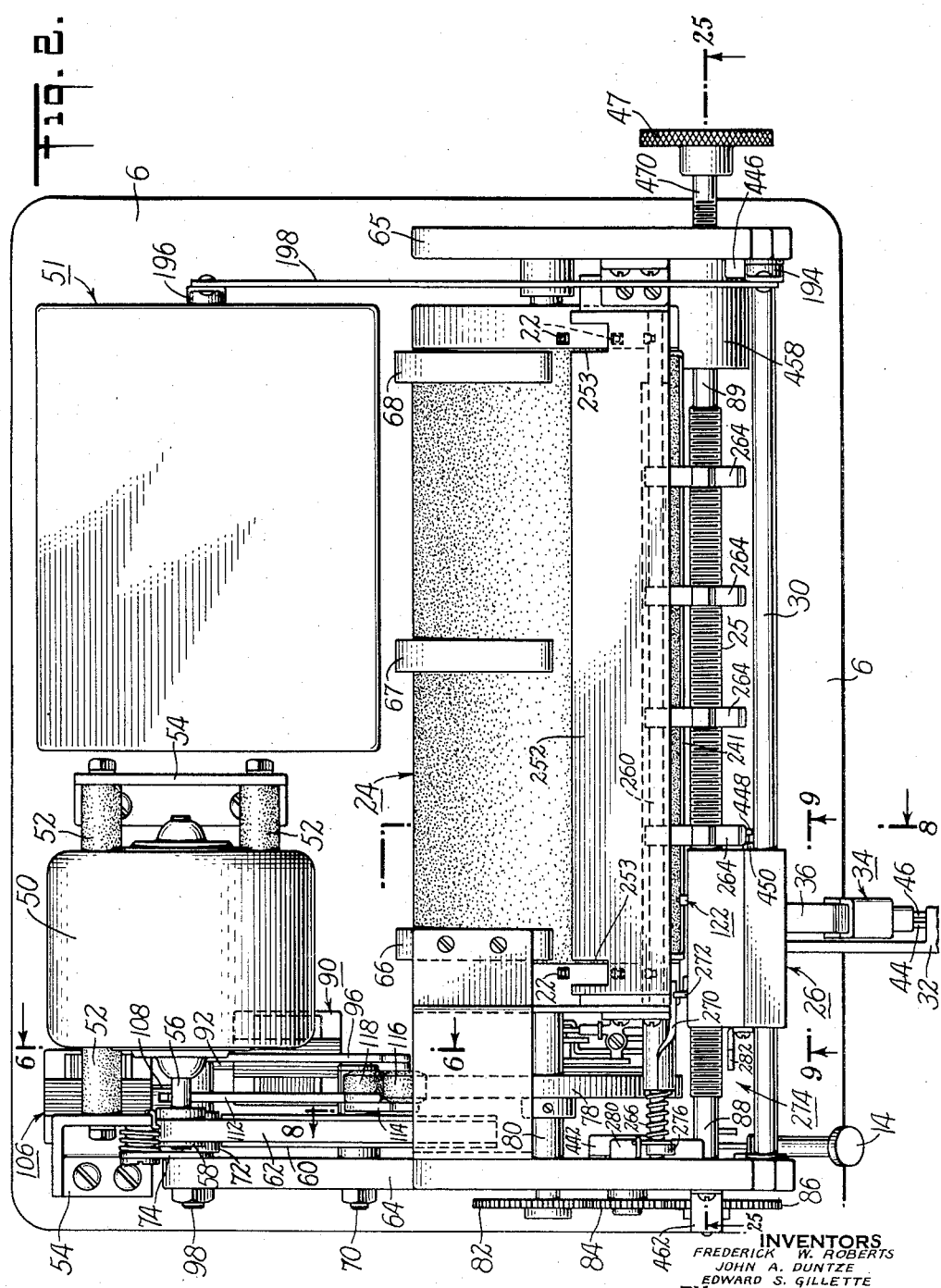

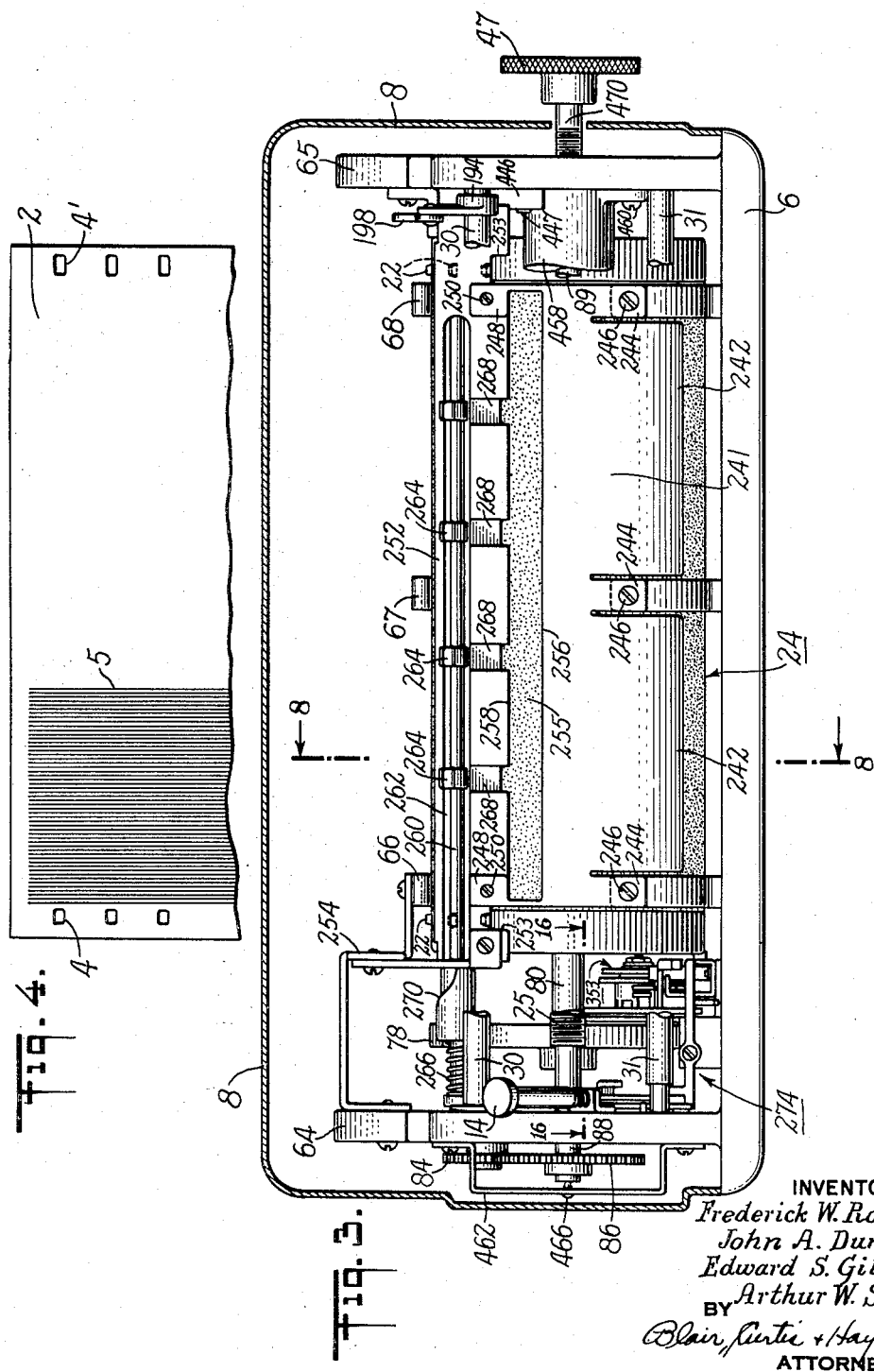

Dec. 23, 1958  F. W. ROBERTS ET AL  2,865,637
SOUND RECORDING AND REPRODUCING APPARATUS
Filed Aug. 7, 1947  12 Sheets-Sheet 4
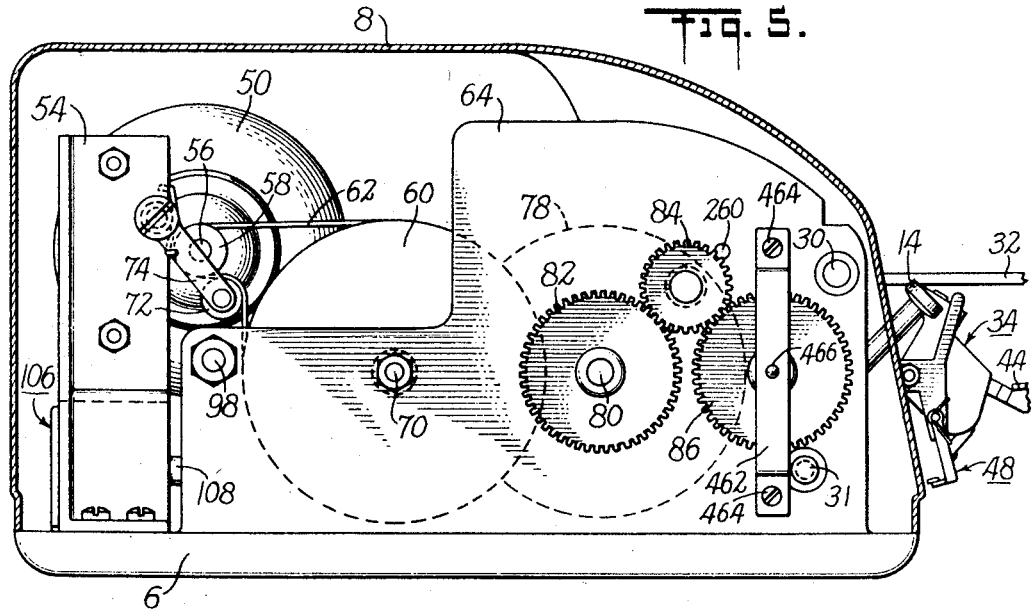
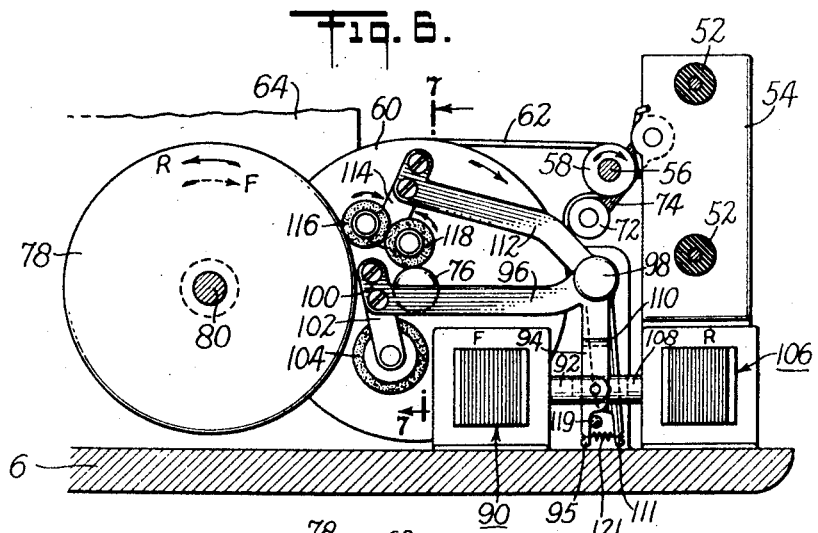
INVENTORS
Frederick W. Roberts
John A. Duntze
Edward S. Gillette
Arthur W. Skoog
BY
Blair, Curtis & Hayward
ATTORNEYS

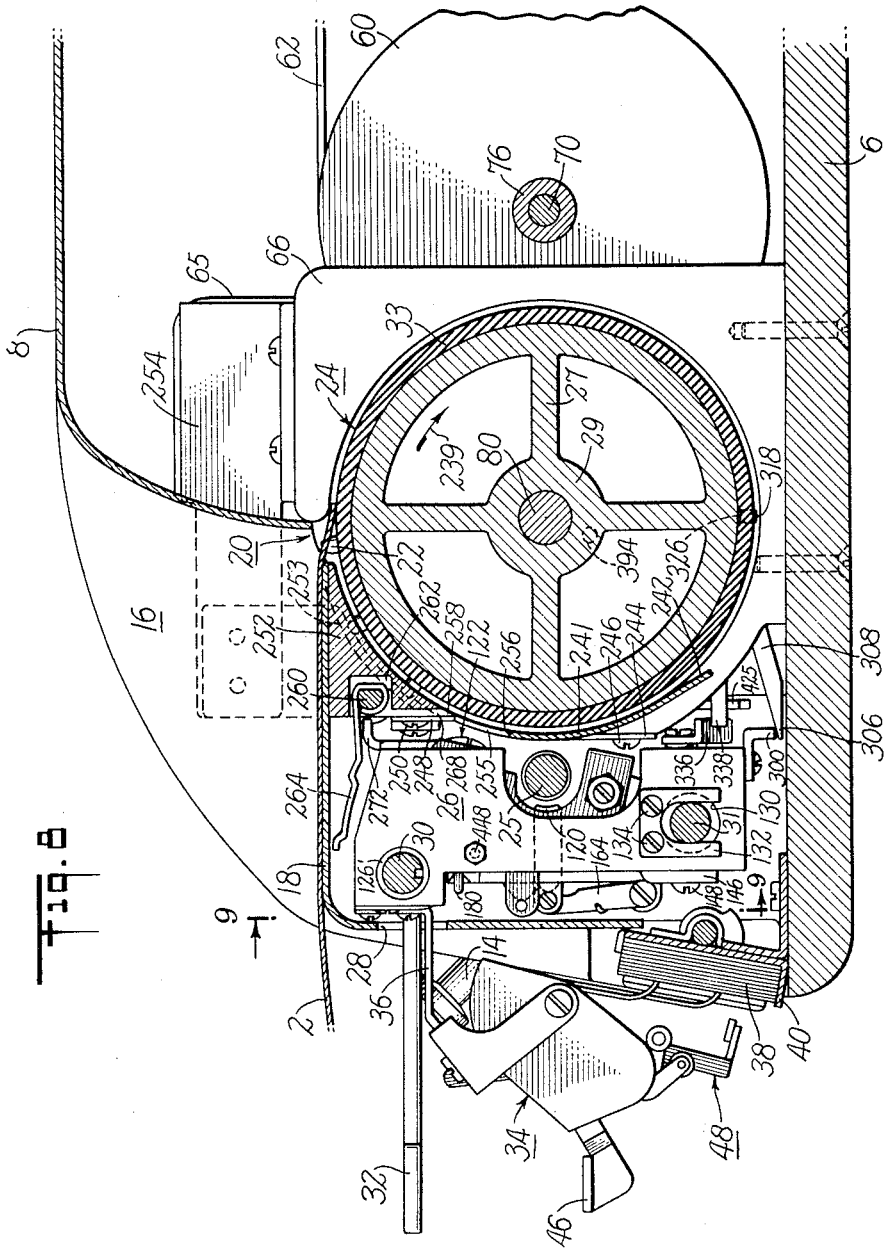

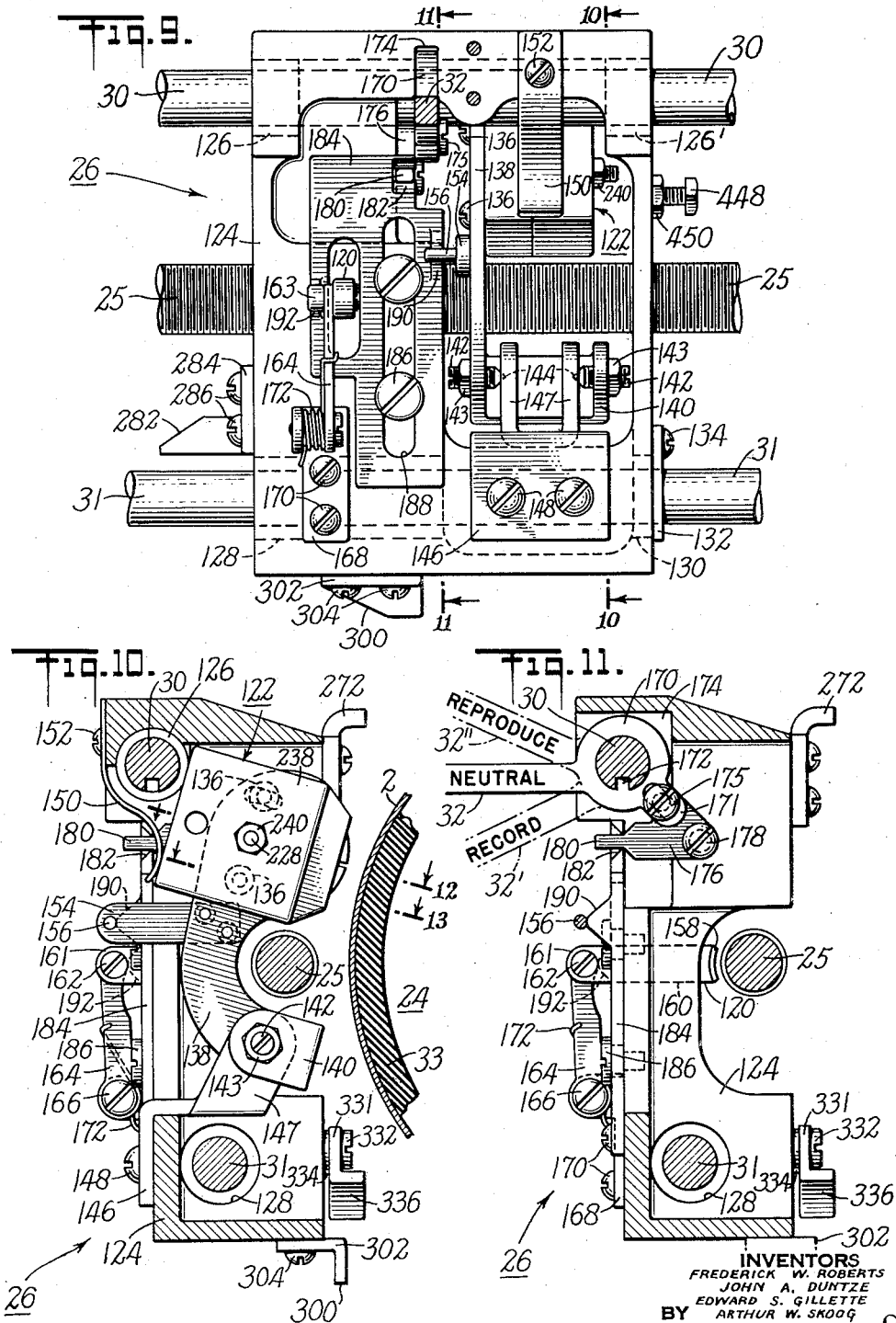

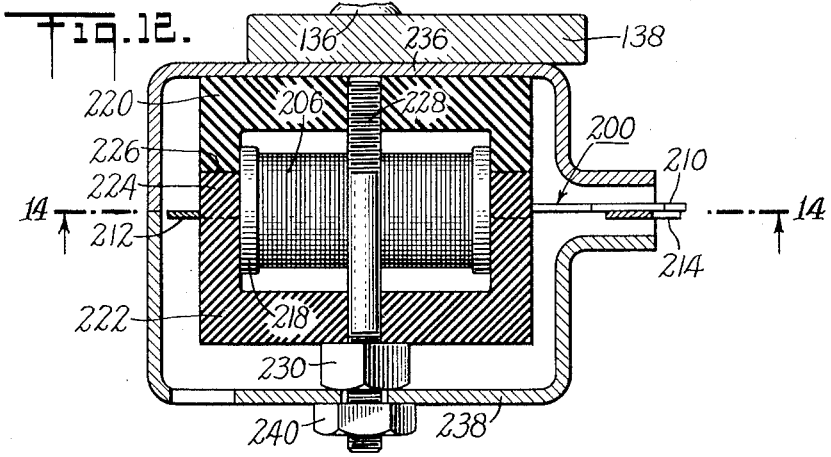
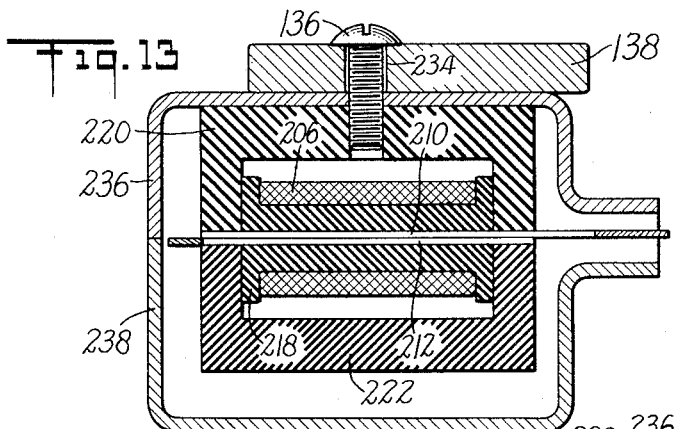
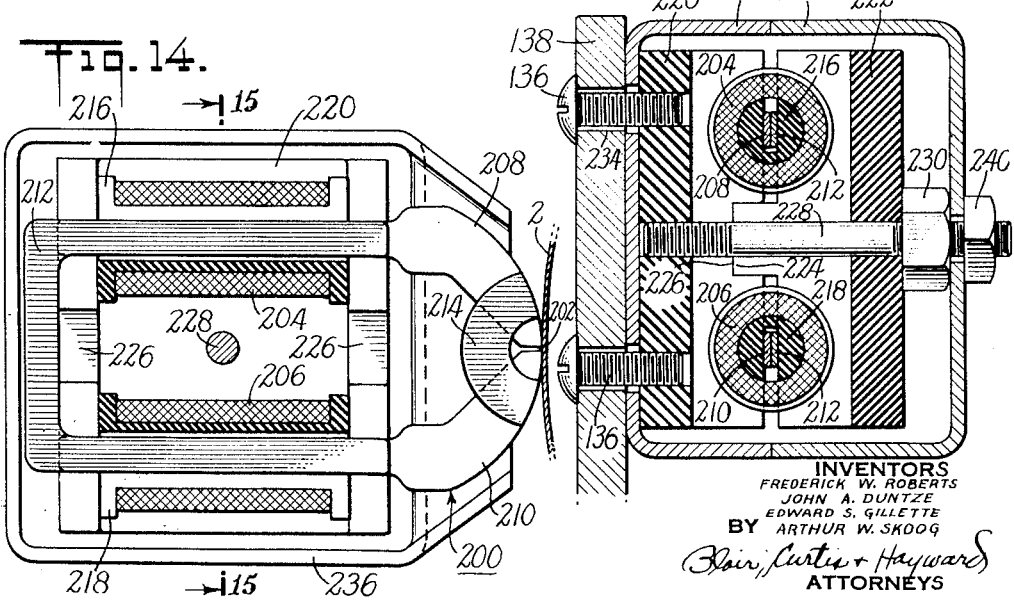

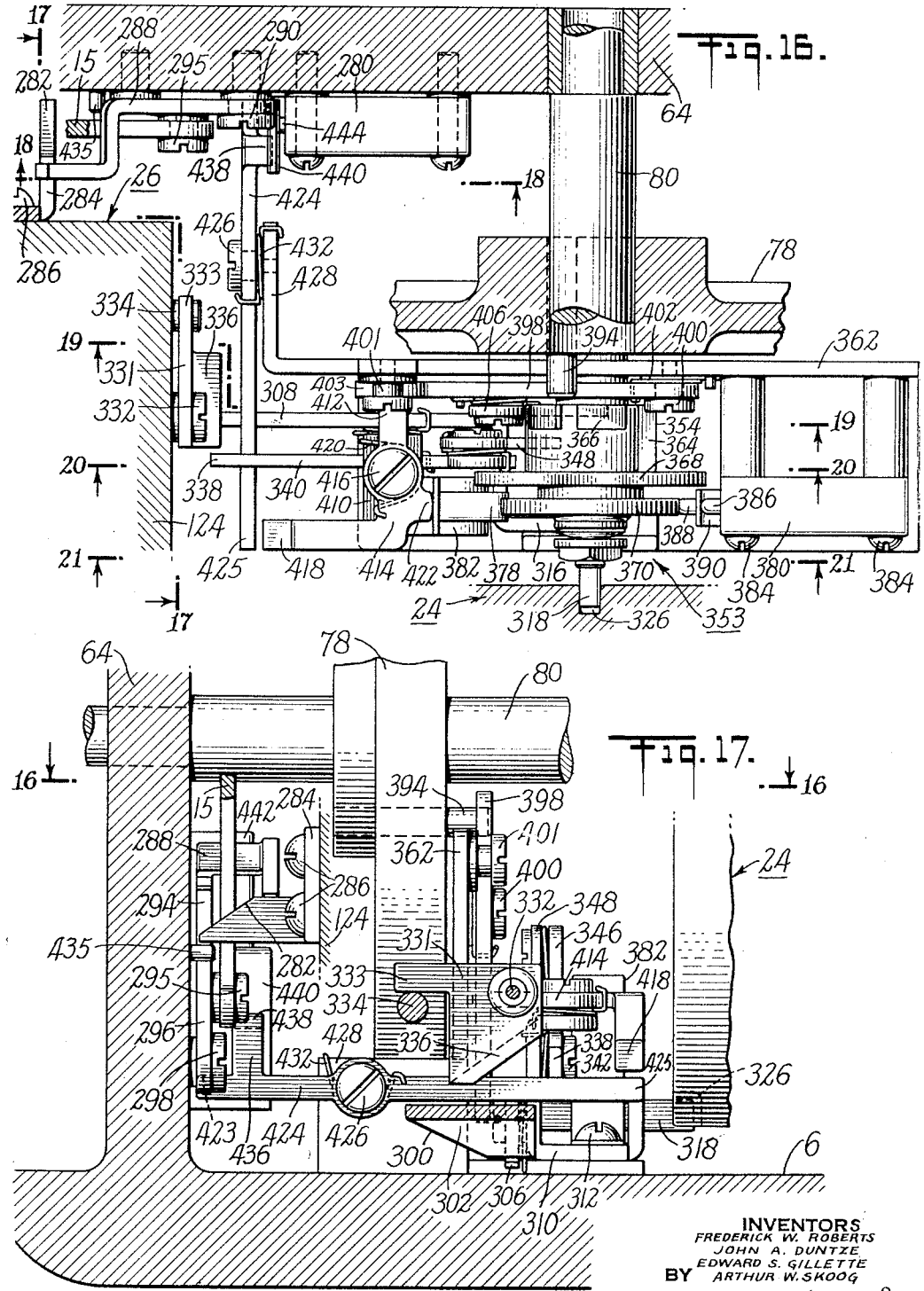

Dec. 23, 1958     F. W. ROBERTS ET AL     2,865,637
SOUND RECORDING AND REPRODUCING APPARATUS
Filed Aug. 7, 1947     12 Sheets-Sheet 9
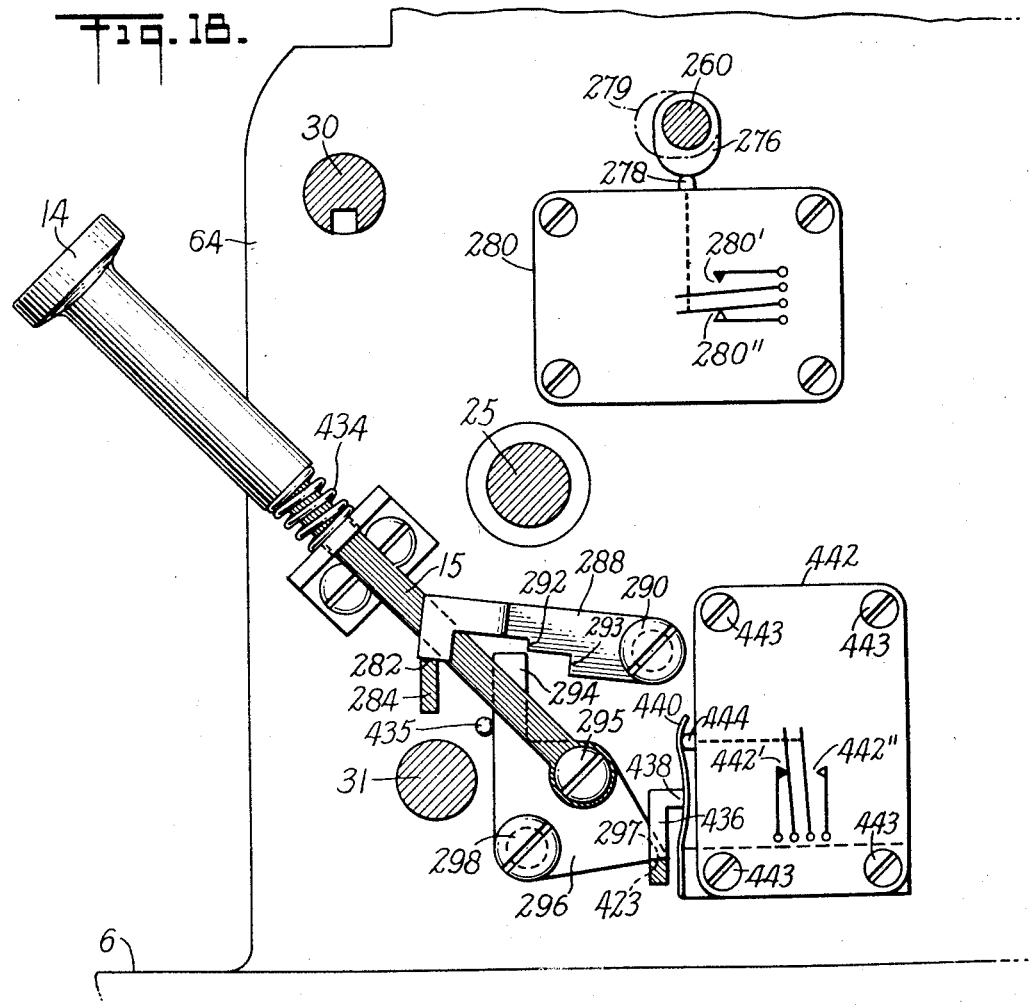
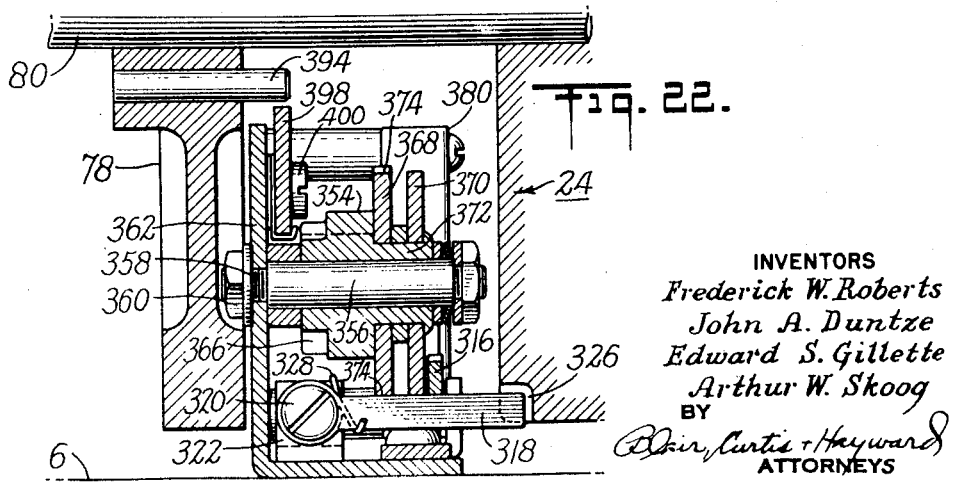
INVENTORS
*Frederick W. Roberts*
*John A. Duntze*
*Edward S. Gillette*
*Arthur W. Skoog*
BY
ATTORNEYS Dec. 23, 1958     F. W. ROBERTS ET AL     2,865,637
SOUND RECORDING AND REPRODUCING APPARATUS
Filed Aug. 7, 1947

INVENTORS
FREDERICK W. ROBERTS
JOHN A. DUNTZE
EDWARD S. GILLETTE
BY ARTHUR W. SKOOG

Blair, Curtis + Hayward
ATTORNEYS

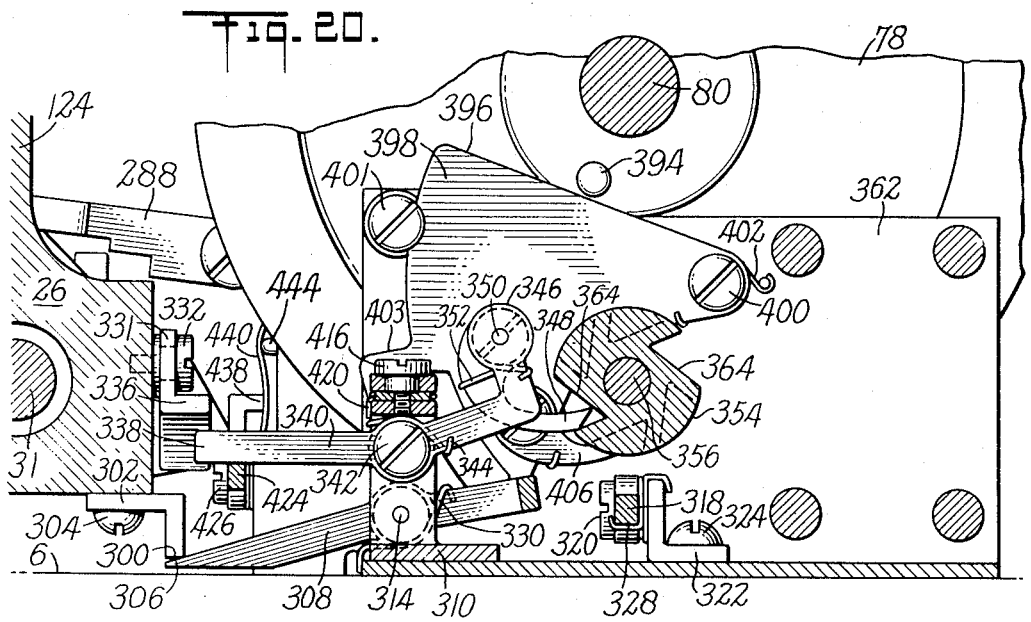

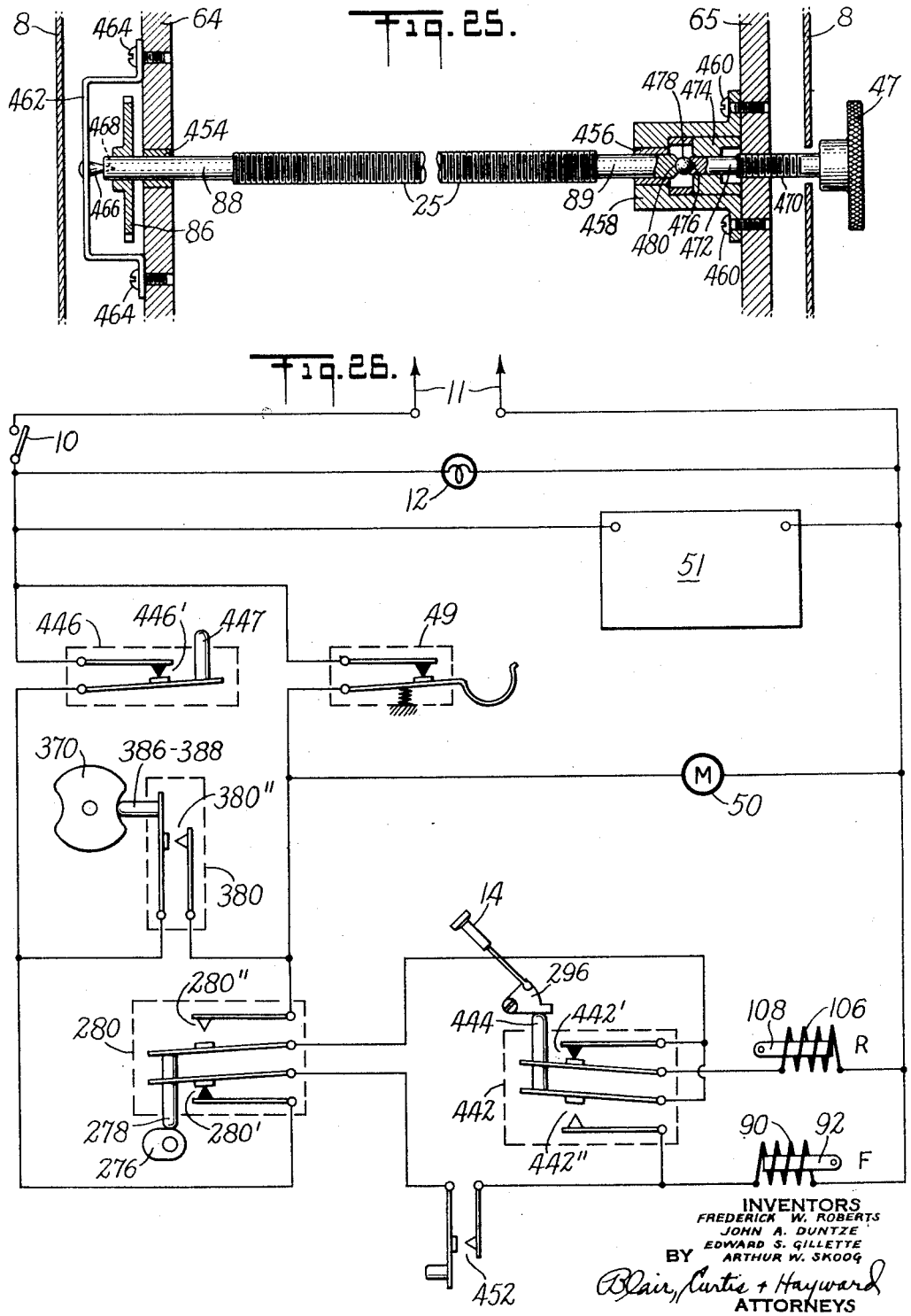

United States Patent Office 2,865,637
Patented Dec. 23, 1958

2,865,637

SOUND RECORDING AND REPRODUCING APPARATUS

Frederick W. Roberts, Fairfield, Edward S. Gillette, Bridgeport, John A. Duntze, East Norwalk, and Arthur W. Skoog, Bridgeport, Conn., assignors to Dictaphone Corporation, Bridgeport, Conn.

Application August 7, 1947, Serial No. 767,210

31 Claims. (Cl. 274—4)

This invention relates to sound recording and reproducing apparatus, and more particularly to apparatus of this type using a record in the form of a rectangular sheet which is unbreakable and which may be readily filed, folded, and mailed without injury.

In the past, sound recording and reproducing machines have been proposed using record media having such characteristics, but such machines have not proved to be practical, both because suitable record materials were not available and because the mechanisms proposed for handling such record media were complex and inefficient, if not inoperative.

Recent scientific progress has produced record material in the form of thin flexible sheets of plastic and of coated or impregnated paper on which satisfactory sound record tracks can be placed. One such material is a magnetic record medium taking the form of a paper sheet having a magnetizable coating on one face. Thin sheets of cellulose acetate and similar plastics also are now readily available for this purpose.

It is an object of this invention to provide a simple and practical mechanism for handling rectangular sheets of flexible recording media of this type, and to provide sound recording and reproducing machines incorporating such record handling mechanisms.

It is the further object of this invention to provide sound recording and reproducing apparatus of the dictating machine variety which utilizes such unbreakable, filable, foldable and mailable rectangular record sheet material with the same facility and minimum of controls customarily incorporated in such devices which now are in widespread use in business offices.

These and other apparent objects and advantages of the invention will be in part obvious and in part pointed out hereinafter.

The invention, accordingly, consists of the features of construction, combinations of elements, and arrangements of parts as will be exemplified in the structure to be hereinafter described and the scope of which will be indicated in the following claims.

One of the various possible embodiments of the inventions is shown in the accompanying drawings, in which:

Figure 1 is a perspective view of a dictating machine embodying the inventions adapted to use as a magnetic record medium a rectangular sheet of paper having a magnetizable coating;

Figure 2 is a plan view from above of the machine in Figure 1 with the cover removed;

Figure 3 is a front elevation of the machine of Figure 1 with the housing, recorder carriage, feedscrew, and carriage guide rods broken away to show more clearly the record handling mechanism;

Figure 4 is a plan view showing the general layout of the ends of a rectangular record sheet adapted for use with the machine of Figure 1;

Figure 5 is an elevation of the left-hand end of the machine as shown in Figure 1 with the cover broken away to show more clearly the details of the driving mechanism;

Figure 6 is a section taken on line 6—6 of Figure 2 showing details of the clutch control mechanism;

Figure 7 is a section taken on line 7—7 of Figure 6 showing another view of the clutch structure;

Figure 8 is an enlarged sectional elevation taken on lines 8—8 of Figures 2 and 3 to show details of the record supporting mandrel, the recorder carriage mounting, and the correction indicating device;

Figure 9 is an enlarged front elevation of the recorder carriage taken in the direction of arrows 9—9 in Figures 2 and 8;

Figure 10 is a section of the carriage structure taken on line 10—10 of Figure 9;

Figure 11 is another section of the carriage mechanism taken on line 11—11 of Figure 9;

Figure 12 is an enlarged cross-section of the magnetic recording and reproducing head taken on line 12—12 of Figure 10;

Figure 13 is another section of this magnetic head taken on line 13—13 of Figure 10;

Figure 14 is a further cross-section of the magnetic head taken on line 14—14 of Figure 12;

Figure 15 is an additional cross-section of this magnetic head taken on line 15—15 of Figure 14;

Figure 16 is an enlarged and partial view of the record mandrel indexing and control mechanism taken from above on lines 16—16 of Figures 3 and 17;

Figure 17 is a front view of this portion of the record indexing and control mechanism taken on line 17—17 of Figure 16;

Figure 18 is a section taken on line 18—18 of Figure 16 showing details of the record loading plunger;

Figure 20 is another section of this mechanism taken on line 20—20 of Figure 16;

Figure 21 is still another section of the indexing and control mechanism taken on line 21—21 of Figure 16;

Figure 22 is a further section of this mechanism taken on line 22—22 of Figure 21;

Figure 25 shows a section of the phasing adjustment structure taken on line 25—25 of Figure 2; and Figure 26 shows diagrammatically the electrical circuit of this machine.

Figure 19:
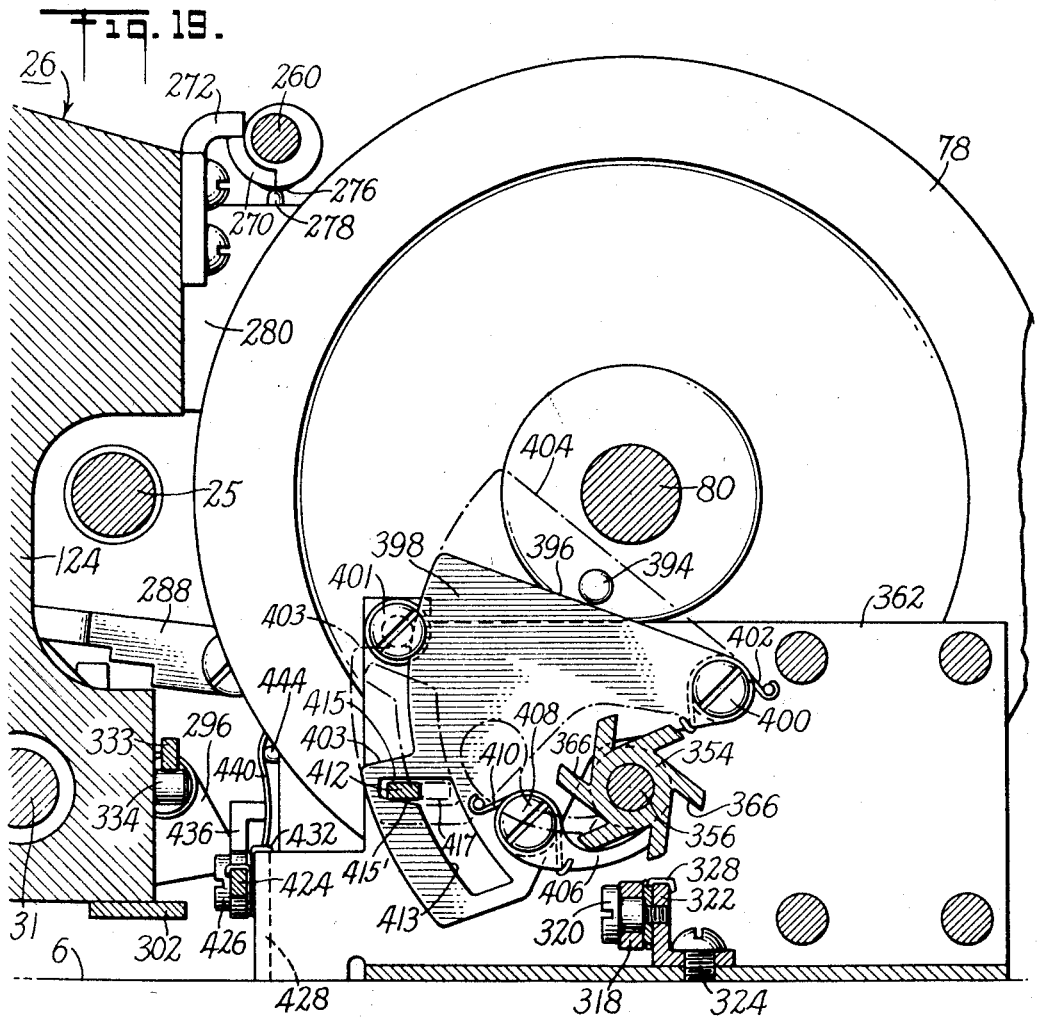
Figure 19 is a section taken on line 19—19 of Figure 16 showing additional details of the record mandrel indexing and control mechanism.
Figure 23:
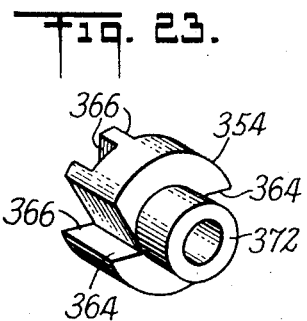
Figures 23 and 24 are two views, in perspective, of the ratchet gear forming a portion of the mandrel indexing and control mechanism.
Figure 24:
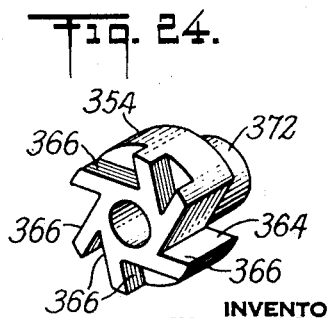

Referring to Figure 1, there is shown in perspective the external view of an office dictating machine embodying the present invention adapted to utilize a record in the form of a rectangular paper sheet having a suitable magnetizable coating. This machine is adapted to use as a record, a sheet of such material 8½" wide and 11" long, these dimensions being chosen because they are those of the generally accepted standard business letter paper. Referring for the moment to Figure 4, there is shown the top portion of one such paper recorded sheet 2 having three rectangular guide or sprocket holes 4 and 4' running downwardly along each side of the sheet. These holes cooperate with pins or sprocket teeth on a record drum, as will hereinafter be described, to hold the record sheet in proper alignment and drive it past the recording and reproducing head.

This machine has a base member 6 on which the various elements of the machine are mounted and suitably concealed by a housing 8 surrounding these elements, and it is equipped with devices for effecting all of the controls usually provided in standard business dictating machines. Mounted on the lower left-hand portion of the face of the housing 8 is a main power switch 10 for turning the machine on and off. Next to this switch 10 is a signal light 12 for indicating the operating condition of the machine. Immediately above the switch 10 and signal light 12 is a record "inject" or loading plunger 14 projecting through the front of the housing 8. When this plunger is pushed it puts into operation an automatic loading arrangement, hereinafter to be described, which pulls the rectangular sheet record 2 into the machine and wraps it in proper position for recording around the record mandrel or drum, generally indicated at 24. To permit this, the housing 8 is provided with a recessed portion, generally indicated at 16, having a horizontal shelf-like portion 18 terminating in a slot, generally indicated at 20. The perforated end of a record sheet 2 is placed on the shelf 18 so that the first of the sprocket holes 4 and 4' cover the first of a series of sprocket teeth 22 mounted along the edges of the record drum 24 on which the record is wrapped during operation, all as will be described in greater detail hereinafter. When the record loading plunger 14 is pushed to initiate operation of the automatic loading mechanism, the record sheet is pulled through the slot 20 by the pins 22 and is wrapped accurately around the drum 24 preparatory to recording. A carriage, shown only partially through a longitudinal slot 28 in the front face of housing 8, and generally indicated at 26, is slidably mounted, as will hereinafter be described, on two carriage guide rods, one of which is shown in Figure 1 through the slot 28 at 30. This carriage 26 traverses a magnetic recording head, not shown in Figure 1, longitudinally across the face of the record sheet 2 to produce a spiral sound track thereon when it is wrapped around the drum 24 in the form of a cylinder.

A control lever 32 is provided at the front of the machine to condition it for recording or reproducing, or to put it in neutral condition when desired. This control lever 32 is pivotally mounted on the carriage 26 and projects forwardly through the slot 28 in the front face of the housing 8. When this lever is in the position shown in Figure 1 the machine is in "neutral" condition. When this lever 32 is depressed, the machine is in condition for "recording," and when it is raised to a position above that shown, the machine is in condition for "reproducing." A correction indicator mechanism, generally indicated at 34, is also secured to carriage 26 by a bracket 36 which extends through the slot 28 in the front face of the housing 8. This correction indicator mechanism 34, which may be any suitable structure of the type known in the art such as that shown in U. S. Patent No. 2,135,470 to J. E. Renholdt, cooperates with a correction pad 38 positioned along the lower front face of the machine. This correction pad 38 rests in a pad receptacle 40 and is held in place thereon by a suitable clamping mechanism (not shown) actuated by a crank-like lever 42. As is customary, this correction mechanism 34 carries two pivoted levers 44 and 46 with which suitable indications of "corrections" and "length of letter" may be made on pad 38. The bracket 36 also carries a "progress of recording" indicator, generally indicated at 48, which will be described hereinafter. In addition to the usual dictating controls, the machine is also provided with a "phasing" control operated by a knob 47 projecting from the right-hand side of the housing 8 to permit synchronization of the positions of the recording head and record sound track under certain special circumstances as will hereinafter be described.

As is the custom in office dictating machines, this machine is provided with a suitable sound translating device (not shown), such, for example, as a hand-held combination microphone and loudspeaker unit, or such a combination unit mounted on a stand for desk use. It is also provided with control switches for operating a suitable clutch mechanism, hereinafter to be described, for starting and stopping rotation of the record supporting mandrel 24 during recording or reproducing. If a hand-held microphone-loudspeaker unit is used, such a control switch may take the form of a thumb-button on this unit, such as that shown in U. S. Patent No. 2,367,413 to J. M. Lucarelle; whereas, if a desk type microphone-loudspeaker unit is used, a suitable foot switch may be provided for operating the clutch mechanism, such, for example, as that shown in U. S. Patent No. 2,374,561 to L. D. Norton et al. Further, in accordance with the usual practice in machines of this type, in order to conserve power when not actually recording or reproducing, a switch is provided to keep the motor turned off on all other occasions. This switch may take the form of a hook or cradle switch (as is diagrammatically indicated in Figure 26 at 49) mounted on the left side of the machine where the microphone unit may be hung when not in use, or of an auxiliary switch in the foot control mechanism such as that described in the above-mentioned U. S. Patent No. 2,374,561. In order to provide electrical power for operating the machine, it is connected by the usual cable (not shown) to a suitable power supply as is illustrated diagrammatically at 11 in Figure 26.

In order to simplify the understanding of the details of construction of this machine, it seems desirable to provide a description of its manner of operation so as to point out the various functions which are performed by the inter-related operation of its various elements.

When the power switch 10 is turned on, the signal light 12 lights to show that power has been applied to the machine, and an electronic amplifier unit mounted in the machine as will be hereinafter described, is energized. When a paper record sheet 2 is placed on the shelf 18 in the front of housing 8, with the first of the sprocket holes 4 meshing with the first of the sprocket pins 22 on the drum 24, and the loading plunger 14 is pressed, an automatic record loading mechanism comes into play which operates the clutch mechanism to connect the record drum 24 to the driving motor. This causes the drum 24 to rotate to pull the sheet 2 of record paper into the machine and wrap it around the drum 24. At this time, an automatic indexing mechanism becomes effective to stop rotation of the record drum after it has revolved sufficiently completely and smoothly to wrap the record sheet therearound. Thereafter, while a sound record is being made, the recording is started and stopped by clutching and unclutching the drive between the motor and the record drum 24.

If at any time during the recording it is desired to listen back to matter already recorded, control lever 32 is lifted to neutral position, used to slide the carriage back to the desired point as indicated on the pad 38, and then lifted to its upper position for reproducing. When the desired portion has been heard, the lever 32 is pushed downwardly to its "record" position and recording is continued. When the recording is finished, or when the record sheet is completely filled, the control lever 32 is moved into neutral position and the carriage 26 is moved back by hand to its extreme left-hand position. Upon reaching this position, it initiates an automatic record ejecting and indexing cycle. This is achieved by a control mechanism which causes the drum 24 to revolve in reverse direction to eject the record sheet through the slot 20 and onto the shelf 18, so that the operator may pick it up and pass it on to be transcribed by a typist. At the same time this mechanism causes the drum 24 to continue reverse rotation past the point where the record sheet is completely clear of the machine to an indexing position where it is latched in place so that the sprocket pins 22 are in proper position to receive the next sheet of record paper so that the cycle of operations may be repeated.

Now that the overall features and functions of this machine embodying the inventions has been described in general terms, various portions of the mechanism will be considered in detail. In order that these details may be more readily understood, the following description of the construction and operation of the machine will be subdivided into several sections, each relating to a portion of the mechanism performing a major function.

Driving mechanism

Referring to Figure 2 which shows a plan view from above of the machine of Figure 1 with the cover 8 removed, a suitable driving motor 50 is positioned in the rear left-hand corner of the base 6. This motor 50 operates a driving mechanism, disposed along the left-hand side of the machine, to rotate the record supporting mandrel 24, disposed along the front portion of the base 6, and a feedscrew 25 parallel thereto which drives the carriage 26 transversely of the mandrel 24.

At the left-hand and right-hand ends of the base 6 are provided two vertical frame members 64 and 65, respectively, which are perpendicular to the base and support various portions of the mechanism, including the axle 80 of the mandrel 24, the feedscrew 25, and the carriage guide rods, all as will hereinafter be described. In addition, three other frame members or "bulkheads" 66, 67 and 68, are provided, perpendicular to the base 6 and intermediate and parallel to end frame members 64 and 65, to aid in positioning and holding the paper sheet record 2 when it is wrapped around record drum 24.

The primary elements of the driving mechanism can be seen most readily by referring to Figure 5 showing an elevation of the left-hand end of the machine with the cover broken away. The motor 50 is secured by resilient anti-vibration mounting elements 52 (see Figure 2) to brackets 54 which, in turn, are fastened to the machine base 6. The shaft 56 of motor 50 carries a driving pulley 58 which drives a speed reduction pulley 60 through a belt 62. The pulley 60 is rotatably mounted on the end frame member 64 by means of a stud shaft 70. To maintain tension in the belt 62, an idler roller 72 is provided, rotatably mounted on a spring biased arm 74 pivoted to one bracket 54.

Turning to Figure 6, which shows the opposite side of this driving mechanism, the speed reduction pulley 60 has a cylindrical hub portion 76 projecting therefrom on the side opposite the end frame member 64 which, through a succession of rollers of a clutch mechanism hereinafter to be described in greater detail, drives another large diameter pulley 78 secured to the axle 80 of the record mandrel 24 to rotate it at the desired recording speed. Reverting to Figure 5, on the left-hand side of the frame member 64, mandrel axle 80 carries a gear 82, which, through an intermediate gear 84 rotatably mounted in this frame member 64 and a third gear 86 secured to the left-hand end 88 of feedscrew 25, drives the carriage along record drum 24. The diameters of the gears 82, 84 and 86 in the gear train between the record drum drive shaft 80 and the feedscrew shaft 88 are so selected as to provide the desired ratio between the pitch of the spiral sound track on the record sheet 2 and the pitch of the feedscrew 25. Although any suitable ratio may be used in this drive system, it has been found desirable to use a one to one ratio so that the feedscrew has precisely the same pitch as the sound track. However, a feedscrew having a pitch equal to a sub-multiple of pitch of the sound track may be used if desired. With such a construction there is no need for adjustment of the phasing control 47 except for infrequent occasions when the record sheet undergoes a dimensional change as will be described hereinafter.

As an illustration of actual values for this drive system which have been found to produce records of suitable quality while at the same time providing reasonable economy of record area, with a record drum of approximately 3½" in diameter rotated at a speed of 39 revolutions per minute, i. e., about two thirds of a revolution per second, recordings of a quality quite satisfactory for office dictating purposes can be made; and with a record sound track pitch of 52 lines per inch and a feedscrew of similar pitch, about 10 minutes of recording can be placed on an 8½" by 11" record sheet.

Clutch mechanism

The clutch mechanism for connecting the motor 50 to the driving arrangement just described is most clearly illustrated in Figure 6. It comprises two portions of substantially similar construction, one for driving the record supporting drum in a forward direction for loading the record thereon and for recording; and another for reversing the direction of the rotation of the drum when the record sheet is to be ejected. The operating element of the clutch mechanism which causes the record drum to be driven in a forward direction (clockwise as shown in Figure 6) is an electromagnet solenoid, generally indicated at 90. This electromagnet 90 is adapted, when energized, to attract an armature member 92, pivotally connected to the end of one arm 94 of a bell crank lever 96 which is pivotally mounted at its apex on a stud shaft 98 secured to the left end frame member 64. The other end 100 of the bell crank lever 96 carries loosely a cross-member 102 on the end of which is pivoted a friction roller or puck 104 in such a position that, when the electromagnet 90 is energized to attract armature 92, the bell crank 96 moves the puck 104 into engagement both with the driving hub 76 of pulley 60 and the periphery of mandrel drive pulley 78. This causes the pulley 78, and therefor the record supporting drum, to be driven in a clockwise direction, the motor pulley 58 revolving in a clockwise direction as shown in Figure 6. The clutch mechanism for reversing the direction of rotation of the record drum is substantially similar to that just described. It comprises a second electromagnet solenoid, generally indicated at 106, arranged to attract another armature member 108 secured to the end 110 of a second bell crank lever 112 pivoted on the same stud shaft 98. The other end of this bell crank lever 112 carries loosely a cross-member 114 on the end of which are rotatably mounted two frictional idler rollers or pucks 116 and 118 so positioned that, when the electromagnet 106 is energized to attract armature member 108, these rollers 116 and 118 are moved into contact with each other and with the driving hub 76 of pulley 60 and the periphery of the mandrel drive pulley 78, in much the same manner that puck 104 is moved therebetween for forward rotation of the mandrel. In the present instance, however, the interposition of two intermediate rollers instead of one causes the mandrel pulley 78, and therefore the record supporting drum, to be revolved in the reverse direction, counterclockwise as shown in Figure 6. In both of these mechanisms, the intermediate rollers 104, 116, and 118 are mounted on the loosely-carried cross-members 102 and 114 so that they can be pulled readily into proper driving position between pulleys 76 and 78 by the bell crank levers 96 and 112.

In order to maintain the clutch mechanism normally in declutched condition so that the record supporting drum is not rotated even though the motor 50 is energized, the frictional drive rollers 104, 116 and 118 are normally held out of engagement with driving hub 76 and the periphery of mandrel drive pulley 78 by means of a tension bias spring 121 extending between two portions 95 and 111 projecting downwardly from the ends 94 and 110 of the bell cranks 96 and 112, respectively. A stop pin 119 is provided between these downward projections 95 and 111 to determine the disengaged positions of the friction rollers 104, 116 and 118.

With the clutch mechanism just described, the record drum 24 can be driven in a forward direction for loading a record sheet thereon or for recording, or in a reverse direction for ejecting the record, dependent upon the selective energization of electromagnets 90 or 106; and, through the train of gears 82, 84 and 86, and the feedscrew 25, the carriage 26 is driven in synchronism with this rotation of the record drum 24 as described hereinbefore in connection with Figure 5.

*Carriage assembly*

The position of the carriage 26 with respect to the record drum 24, as the carriage is traversed therealong by means of feedscrew 25, can best be seen by referring to Figure 8 which shows a cross-section of the machine taken on lines 8—8 of Figures 2 and 3. The carriage 26 slides on two support and guide rods 30 and 31 mounted along the front of the machine parallel to the axle 80 of the record drum 24 between the end frame members 64 and 65. It is moved therealong when a feednut 120 is engaged with the feedscrew 25 which also is mounted between end frame members 64 and 65 parallel to drum 24 and guide rod 30 and 31. This feednut 120 is moved into and out of engagement with feedscrew 25 by the record-reproduce control lever 32 through a linkage mechanism hereinafter to be described. It is moved out of engagement with the feedscrew when the lever 32 is moved to its central or "neutral" position, and is moved into engagement with the feedscrew when the control lever 32 is moved downwardly to "record" position or upwardly to "reproduce" position. At the same time, movement of this control lever 32 also operates other mechanisms to move a magnetic recording and reproducing head, generally indicated at 122, into and out of an engagement with the record sheet wrapped around the record drum 24.

The specific mechanism whereby these various functions of the carriage assembly 26 are accomplished is best illustrated by reference to Figures 9, 10 and 11. Figure 9 is a front elevation of the carriage assembly taken in the direction of arrows 9—9 in Figure 2, while Figures 10 and 11 are sections of the carriage assembly taken on lines 10—10 and 11—11, respectively, of Figure 9. The carriage 26 comprises an approximately rectangular metal frame 124 on which is mounted the control lever 32, the feednut 120, and the recording and reproducing head 122. The upper guide rod 30 passes through the top of the frame 124 through suitable bushings 126 and 126' positioned in either side thereof. In order to prevent binding due to non-parallelism of the guide rods 30 and 31, the lower guide rod 31 passes through large clearance holes 128 and 130 in either side of the frame 124, and suitable alignment is effected by adjustment of a U-shaped guide plate 132 (see also Figure 8) fastened to the right side of carriage frame 124, by means of screws 134 passing through horizontal slots in this guide plate and threaded into the carriage frame. Referring to Figure 8, when suitable forward and backward adjustment of the lower part of the carriage 26 is achieved by sliding the guide plate 132 to proper position, then screws 134 are tightened to maintain this alignment.

As shown in Figures 9 and 10, the magnetic recording head 122 is adjustably fastened by screws 136 to a lever 138 having a U-shaped portion 140 at its lower end. Pivot screws 142 are threaded through each side of this U-shaped portion 140 to coact with pivot seats 144 in each side of an upstanding U-shaped end 147 of a bracket 146 which is fastened to the front of the carriage frame 124 by means of screws 148. Lock nuts 143 are threaded on the outer ends of pivot screws 142 to lock them in their desired position. This arrangement provides a pivotal mounting for the recorder head 122 which permits it freedom of movement toward and away from the surface of the record material 2 on the drum 24, as shown in Figure 10, but limits its movements in all other directions so that it always meets the surface of the record in a vertical plane bearing a fixed positional relationship to the carriage position. The recording head 122 is always urged towards the surface of the drum 24 by means of a biasing leaf spring 150 attached to the upper front surface of the carriage frame 124 by means of a screw 152. A positioning arm 154 is rigidly fastened to the recorder supporting bracket 138 between its pivots 142 and the recorder head 122 to project forwardly beyond the surface of the carriage frame 124, as shown in Figure 10. A pin 156 is rigidly fastened to the forward end of this arm 154 and perpendicular thereto, so that movement of this pin in a forward direction, toward the left as shown in Figure 10, raises the recording head 122 from the surface of the record 2 wrapped around the drum 24, as will be hereinafter described in greater detail.

As shown in Figures 9 and 11, the feednut 120 is in the form of a rectangular bar. One end 158 of this feednut bar 120 has a grooved configuration to mesh with the feedscrew 25 when moved into contact with it. This barlike feednut 120 is slidably mounted in a rectangular hole 160 passing through the body of the carriage frame 124. The other end 161 of the feednut 120 is pivotally fastened by a loosely fitting pivot screw 162 to an arm 164 fastened at its other end by a second pivot screw 166 to a right-angle bracket 168 which, in turn, is fixed to the front face of the carriage frame 124 by screws 170. Thus, referring to Figure 11, the feednut 120 may be moved into and out of engagement with the feedscrew 25 by rotation of the arm 164 about the pivot screw 166. As shown in Figure 9, the feednut 120 is biased toward the feedscrew 25 (to the right as is shown in Figure 11) by a spiral bias spring 172 coiled around pivot screw 166.

As mentioned above, control lever 32 is arranged to lift the feednut 120 and recorder head 122 out of engagement with the feedscrew 25 and the record 2, respectively, when it is moved to its intermediate or "neutral" position. This is accomplished with the mechanism shown in Figure 11. Control lever 32 is rotatably mounted on the upper guide rod 30. This guide rod 30 is pivotally mounted in the end frame members 64 and 65 as above described and is splined from end to end. The pivoted end of the control lever 32 is provided with a circular enlarged portion 170 which surrounds the guide rod 30 and carries an inwardly projecting key 172 which coacts with the spline in this guide rod. This enlarged end 170 of control lever 32 is carried in a slot 174 (see Figure 9) in the carriage frame 124 so that it may rotate about the axis of guide rod 30 while sliding therealong as the carriage is traversed across the record drum 24. This enlarged portion 170 of control lever 32 also carries a lug 171 extending downwardly and rearwardly therefrom to which one end of a small bell crank lever 176 is pivotally connected by means of a shoulder screw 175 passing through a slot in the end of lug 171. The apex of this bell crank 176 is pivotally secured to the carriage frame 124 by means of another shoulder screw 178, while the other end 180 of this lever 176 is reduced in cross-section and projects through a tapered hole 182 in a vertical plate 184. This plate 184 is mounted to slide up and down on the front face of the carriage frame 124 by means of two shoulder screws 186 passing through a vertical slot 188 in the plate 184 as shown in Figure 9. This slidable plate 184 carries two triangular cams 190 and 192 projecting from the front face of this sliding plate. When the control lever 32 is in its "neutral" position, the apex of cam 190 is positioned under the pin 156 projecting from arm 154 secured to the pivoted recorder mounting arm 138, and the apex of cam 192 is positioned under a round cap 163 on the end of the pivot screw 162 connecting the feednut 120 with its supporting lever 164, as can be seen most easily in Figures 10 and 11. Thus, when the control lever 32 is moved to its extreme lower or "record" position 32', or its upper or "reproduce" position 32", as shown in Figure 11, its enlarged portion 170 turns with the guide rod 30 around its axis, rotating the lug 171 and thus causing rotation of the small bell crank 176 which, by means of its reduced free end 180 and slot 182 in the sliding plate 184, causes this plate to slide upwardly or downwardly, respectively, so that the cams 190 and 192 slide out from under pin 156 and pivot screw 162, thus causing feednut 120 and recorder head 122 to move to the right into engagement, respectively, with feedscrew 25 and record drum 24 in response to the urging of their biasing springs 172 and 150. Thus carriage 26 may be moved freely when control lever 32 is in "neutral" position, and will be driven by the feedscrew 25 when the control lever 32 is in either "record" or "reproduce" position so that the recorder head 122 follows a spiral sound track on a record surface 2 on drum 24.

As mentioned above, the guide rod 30 is splined and is pivoted at its ends in the end frame standards 64 and 65 so that it rotates through the same angle as control lever 32 when the latter is moved from one position to another. Referring to the right-hand side of Figure 2, this motion is utilized to rotate a lever arm 194 secured to the right-hand end of splined guide rod 30 through a connecting link 198 to rotate a switch arm lever 196 to operate a switch (not shown) mounted in the amplifier 51 to reverse the connections of this amplifier when the machine is changed from recording to reproducing condition, and vice versa, as shown, for example, in U. S. Patent No. 2,143,819 to L. D. Norton.

*Recording and reproducing head*

Details of the magnetic recording and reproducing head 122 may be more readily understood by reference to Figures 12, 13, 14 and 15. This head 122 effectively comprises a closed magnetic circuit, the operative elements of which are generally indicated at 200 in Figure 14, with a small non-magnetic gap 202 in one side thereof and with two coils 204 and 206 each surrounding an opposite leg of this magnetic circuit. This magnetic circuit 200 comprises two symmetrical and oppositely positioned twin flat pole pieces 208 and 210 shaped more or less like hockey sticks and made of high permeability magnetic material magnetically joined at one extremity by a U-shaped piece 212 of similar material whose side members overlie the similar and contiguous portions of pole pieces 208 and 210 which are mechanically joined at the other ends by an arcuate sheet 214 of non-magnetic metal so as to leave these ends separated magnetically by the small air gap 202.

As shown in Figure 15, the coils 204 and 206 are wound on two round bobbins 216 and 218 having rectangular axial slots therethrough to receive the flat magnetic core pieces 208, 210 and 212 forming the magnetic circuit 200. Referring to Figure 13, these flat cores are held together where they emerge from the coil bobbins 216 and 218 by two U-shaped clamps 220 and 222 of non-magnetic material. In order to prevent these two clamps 220 and 222 from moving laterally during assembly, the piece 222 (see Figure 15) is provided on either end with a tongue 224 which fits into a rectangular groove 226 in clamp 220. In order to hold these clamping blocks 220 and 222 together, a stud bolt 228 is threaded into the center of block 220, as shown in Figure 15, and clamped by means of a nut 230 threaded to its other end. In turn, this assembly is fastened to the pivoted pickup supporting arm 138, as shown in Figure 10, by means of two screws 136 which pass through holes 234 in the bracket 138 and are threaded into the clamping block 220 as shown in Figure 15. One of the holes 234 is enlarged to permit adjustment of the position of the recording head 122 with respect to the arm 138. Interposed and clamped between the supporting arm 138 and the clamping block 220 is one half 236 of a cup-shaped housing. This half housing 236 forms, together with a companion half 238, which is held in place by a nut 240 threaded on to the outer end of stud bolt 228 as shown in Figures 12 and 15, a housing completely enclosing the coils and core structure of the head 122. This housing, formed of the two members 236 and 238, preferably is made of Permalloy or some other suitable material of similar magnetic characteristics to shield these elements from stray magnetic fields.

When the two coils 204 and 206 of the head 122 are connected in series and a sound signal current is passed therethrough, it is apparent that, if a magnetizable surface 2 is moved past the air gap 202, as shown, for example, in Figure 14, the magnetizable material thereon will tend to be magnetized in proportion to the current flowing through the coils in the manner usual in magnetic recording; and, conversely, when a variably magnetized surface 2 is drawn past the air gap 202, a variable magnetic flux will be produced in the magnetic circuit 200 which will induce in the coils 204 and 206 a voltage which is a function of this magnetization and which may be amplified and translated into sound in the manner usual in magnetic sound reproduction.

In order that there will be no cross talk between sounds recorded on adjacent sound tracks, it is necessary that the width of the magnetic pole pieces 208 and 210 at the point where they make contact with the surface of record sheet 2 be less than the distance between adjacent sound tracks, i. e. less than the pitch of the sound track spiral. For a machine of the characteristics cited above as an illustration in which the sound track has a pitch of 52 lines per inch so that the distance between adjacent tracks is about .0193 inch, pole pieces having a width of about .016 inch have been found to operate satisfactorily.

*Record supporting drum*

Although the record drum 24 around which a record sheet 2 is wrapped for recording and reproducing, may be of any convenient construction provided it is made of non-magnetic material, it has been found desirable to make it as light as possible thus reducing its inertia to a minimum for easy starting and stopping in rapid response to operation of the clutch mechanism. This insures uniformity of recording speed and minimizes loss of recording area caused by over run during the period between declutching of the record drum drive and the time that the drum comes to a stop. In the present machine this has been accomplished as shown in Figure 8 by forming the drum of a hollow aluminum casting provided with spokes 27 and hubs 29 at either end suitably secured to the mandrel drive shaft 80.

Further, it has been found that, if the surface of the record drum 24 is made of metal or of other hard substance, slight irregularities and discontinuities in its surface or in the record sheet 2 tend to make the recorder head 122 bounce as it moves over the surface of the drum. This motion of the recorder head tends to introduce background noise in the recording. In order to prevent this noise-producing motion of the head 122, the surface of the record drum 24 over which the head passes is coated with a layer 33 of rubber or other suitably resilient material which tends to damp out such oscillations so that the head 122 at all times rides in smooth and intimate contact with the coated surface of the record sheet 2.

*Record handling mechanism*

The mechanism whereby a rectangular paper sheet record 2 is drawn into the machine, wrapped around the record drum 24, properly aligned thereon, driven relative to the recording head 122 while recording and reproducing, and ejected from the machine when desired, can best be seen by reference to Figures 2, 3, and 8. As described above, in this machine, the rectangular paper sheet record 2 is drawn into the machine through the slot 20 by the teeth 22 on the record drum 24 and wrapped therearound with a slight overlap. Thereafter, for recording, the sound track is placed on this record in the form of a cylindrical spiral by the synchonized rotation of the drum 24 and the traversing of the carriage 26 therealong, in the manner usual with cylindrical record machines. However, after a record sheet has been removed from the machine, the sound tracks take the form of a plurality of parallel lines running lengthwise thereon, so they would appear as the lines 5 in Figure 4, if they were visible. In order that this machine may transcribe such a record, it is necessary that when a recorded record sheet is placed in the machine for transcription, the overlapping ends of the record sheet 2 assume the identical longitudinal position with respect to each other that they were in when the record was made so that the ends of each of these parallel sound tracks will assume such a position as once again to form the original continuous spiral sound track around the cylindrical surface formed by the record sheet when it is wrapped around the record drum 24. Accordingly therefore, it is an important function of the record-handling mechanism of this machine invariably to position a record sheet 2 on the drum 24 in precisely the same position regardless of the number of times that the record sheet is removed therefrom and returned thereto; and, in accordance with the present invention, this effect is achieved simply and efficiently. As pointed out above and as shown in Figure 8, the drum 24 is provided with three sprocket-like teeth 22 in a line at each end of the drum. These teeth are rectangular in cross-section, and are precisely dimensioned and positioned to coact with the sprocket holes 4 and 4' along each side of the record paper 2 as shown in Figure 4. It will be noted that although the sprocket holes 4 along the left side of the rectangular record sheet 2 are of precisely the same length as the holes 4' along the right side of the sheet, the latter are considerably wider than the former. This additional hole width is provided to permit longitudinal motion of one end of the record sheet should it suffer a dimensional change due to such conditions as change in humidity and the like as will be discussed hereinafter in greater detail. These teeth 22 and holes 4 serve to grip the record sheet uniformly at all times so that, when the sheet is smoothly wrapped around the drum 24, the overlapping ends of the record sheet 2 are precisely coextensive. In order to insure the record sheets being smoothly wrapped around the record drum 24, the three bulkhead-like members 66, 67 and 68, which are intermediate and parallel to the end frame members 64 and 65, encircle the record drum 24 for about three quarters of its periphery as shown in Figure 8. The inner faces of these members are smooth and parallel to the surface of the drum 24 and are separated therefrom by an amount slightly greater than the thickness of the record sheet itself. Thus, when the drum 24 is rotated in the direction of the arrow 239 in Figure 8 to load a record sheet thereon, these bulkhead members tend to press the record sheet firmly against the periphery of the drum 24 and to hold it snugly against it during recording and reproducing operations. This action of the bulkhead members 66, 67 and 68 is augmented on the forward side of the record drum 24 by a curved guide plate 241 extending along substantially the entire length of the record drum and curved to conform and be substantially parallel to the surface of the drum in the same manner as the inner surfaces of the bulkhead members 66, 67 and 68. The lower edge 242 of this plate 241 is bent slightly away from the surface of the drum as shown in Figure 8, to insure that the leading edge of a record sheet 2 does not strike this edge 242 during loading of the machine. This curved guide plate 241 is held in place along its lower side by means of tab-like portions 244 forming part of the guide plate itself and bent into a vertical plane to be fastened to the ends of bulkhead members 66, 67 and 68 by means of screws 246. The upper edge of the guide plate 241 is fastened by means of other tab-like portions 248 with screws 250 which are threaded into a longitudinal guide member 252 extending along the length of the drum 24 at its upper forward face. This longitudinal guide member 252 is supported at one end by the right-hand frame member 65 and at its other end by a bracket structure 254 secured to the left-hand bulkhead member 66 and to the left-hand frame member 64. The inner side of this guide member 252 adjacent the drum 24 is shaped to parallel the surface of the drum 24 in the same manner as the inner surfaces of bulkheads 66, 67 and 68 and guide plate 241 and is provided at both ends with internal grooves 253 to permit the passage of the record engaging pins 22 on the drum 24. In this manner, these elements form a structure that completely encircles the record drum 24 to hold any record sheet wrapped therearound closely and smoothly on its surface. Referring for a moment to Figure 3, the only exception to this complete encirclement of the drum, besides the slot 20 through which the record sheet is inserted to be wrapped around the drum and through which it is ejected when it is removed therefrom, is a slot 255 formed by the upper edge 256 of guide plate 241 and the lower edge 258 of upper guide member 252. This slot 255 is provided to permit the recording head 122 to engage the surface of a record wrapped around the drum 24 throughout its entire length as the drum rotates and the recording head is traversed.

In order to prevent the record from being ejected through this recorder head slot 255 during the operation of ejecting a record sheet from the machine, a mechanism is provided to close this slot during that operation. Referring to Figures 2, 3, and 8, this mechanism includes a rotatable shaft 260 pivotally mounted in the end frame members 64 and 65 and located in a channel 262 in the forward face of upper guide member 252. Four leaf spring bridging arms 264 are secured to this shaft 260 and extend forwardly therefrom when the machine is in operating condition, as shown in Figures 2 and 8, so that the carriage 26 can move underneath these arms without interference from one end of the slot 255 to the other. This bridging arm supporting shaft 260 is normally held in this position by means of a helical biasing spring 266 encircling its left-hand end. When the carriage 26 is moved to its extreme left-hand position to operate the record ejecting mechanism in the manner hereinafter to be described, these bridging arms 264 are rotated in a counterclockwise direction as shown in Figure 8 through slotted portions 268 in the upper guide member 252 and into contact with the upper edge 256 of lower guide plate 241 to complete the encirclement of the record supporting drum 24 during record loading and ejecting operations so that a record sheet can leave the record drum 24 only from its upper surface through slot 20 along the rear edge of shelf 18 in housing 8. This rotation of the bridging arms 264 is effected (see Figure 19) by means of a spiral cam 270 mounted near the left-hand end of the shaft 260 (Figures 2 and 3) and a cam-follower projection 272 mounted near the upper left-hand corner of the back of the carriage frame 124. When the carriage 26 is moved to its extreme left-hand position, this cam-follower 272 rotates cam 270, and thus shaft 260, to move the bridging arms 264 downwardly to bridge the slot 255 during the record ejecting operations initiated by this carriage movement and during record loading operations.

*Record drum control and indexing mechanism*

In order suitably to carry on such record handling operations automatically, this machine is provided with a mechanism for controlling and indexing the record drum so that the paper moving sprocket teeth 22 are properly positioned for loading a new record sheet on the record drum 24 after one has been ejected, for insuring that the record drum 24 makes the proper number of revolutions to complete the operation of loading or unloading a record from the machine, and thereafter for putting the mechanism in proper condition for the next cycle of operations.

This is accomplished by means of an automatic control and indexing mechanism, generally shown in Figures 2 and 3 at 274, located in the forward left-hand corner of the machine. This indexing mechanism 274 is shown enlarged and in greater detail in Figures 16 through 24. Figure 16 is a horizontal section of the control and indexing mechanism taken on line 16—16 of Figure 3 slightly below the axis of the record drum supporting shaft 80 and the feedscrew 25, extending from the end frame 64 through the left-hand edge of the record drum 24, and including the left-hand rear corner of carriage 26 which is in its extreme left-hand position. Figures 17, 18, 19, 20 and 21 all are vertical sections through the portion of the mechanism shown in Figure 16. Figure 17 is a vertical section of this mechanism taken along the line 17—17 of Figure 16 looking toward the rear from the carriage frame 124. Figure 18 is a vertical section taken on line 18—18 of Figure 16 showing the forward portion of the left-hand end vertical frame member 64 and including the mounting of the record loading plunger 14 and certain of the electric switches which perform some of the functions in the automatic operation. Figure 19 is a vertical section taken on line 19—19 of Figure 16 showing the record drum drive pulley 78, a section through the carriage frame member 124, and part of the indexing mechanism. Figures 20 and 21 are vertical sections through Figure 16 on lines 20—20 and 21—21, respectively, except that they show different layers of the automatic control and indexing mechanism. In all of these views the carriage is shown in its extreme left-hand or "record eject" position, a position which is to the left of that in which recording would be started along the left-hand side of the record sheet and to the left of the relationship shown in Figures 1 and 2.

When recording has been completed on a record sheet, the carriage 26 must be moved to this extreme left-hand or "record eject" position to initiate an automatic record ejecting operation and to place the mechanism in condition for loading another record sheet in the machine in response to pressure on the loading plunger 14.

When the carriage is moved to this extreme left-hand position, several operations occur automatically. In the first place, as shown in Figure 19, the cam follower member 272, mounted on the upper left-hand side of the back of the carriage frame 124, encounters the surface of the spiral cam 270, and rotates the shaft 260 to cause the bridging arms 264 to move downwardly to cover the recording head slot 255. At the same time, as shown in Figures 2, 3 and 18, rotation of this shaft 260 rotates an eccentric cam 276 fixed to the left-hand end of shaft 260. Rotation of this cam 276 from its normal position shown by dotted line 279 in Figure 18 to its rotated position shown by the full lines, pushes the actuating button 278 of a reversing and limit switch 280 provided with two sets of contacts, one set 280' normally-closed and the other set 280" normally-open. This operation opens the normally-closed contacts 280', thus breaking the circuit to the forward-driving clutch-operating solenoid 90 (Figure 6), and closes the normally-open contacts 280" to the reverse-driving clutch-operating solenoid 106 to reverse the direction of rotation of the record drum 24 for removal of the sheet record wrapped around it.

Referring now to Figures 17 and 18, another effect of moving the carriage 26 to its extreme leftward or "record eject" position is to move a camming surface 282, forming the upper edge of a right angle bracket 284 mounted on the left-hand end of carriage frame 124 by means of screws 286, to lift up a plunger plate latch 288 (Figure 18) pivoted by a shoulder screw 290 to the left-hand end frame member 64. This lifts a shoulder portion 292 of this lever 288 from in front of an upstanding end 294 of a bell crank plunger plate lever 296, pivoted by means of a shoulder screw 298 to the left end frame member 64 and connected to the lower end 15 of record-loading plunger 14 by a pivot screw 295. This unlatches a mechanism associated with the record-loading plunger 14 to permit it to be depressed as soon as the automatic record ejection and indexing operations are completed. The latch lever 288 is also provided with a second shoulder portion 293 which acts as a stop to limit the clockwise rotation of plunger plate lever 296 by intercepting its upstanding arm 294 when the plunger 14 is depressed.

Turning to Figures 17, 20 and 21, this leftward motion of the carriage 26 to its extreme position also causes a similar cam surface 300 on a right angle bracket 302 fastened to the underside of the left-hand portion of the carriage frame 124 by means of screws 304 (Figure 9), to depress the tapered forward end 306 of a lever 308. This lever 308 is pivoted at its middle by means of a shoulder screw 314 to a right angle bracket 310 which is secured to the base 6 by screws 312. The rearward portion of this pivoted lever 380 is bent to the right and then to the rear again so that its other end 316 projects over a mandrel index latch arm 318 as shown in Figure 22 which is a sectional view taken on line 22—22 of Figure 21. This mandrel latch arm 318 is pivoted (see Figure 20) by means of a shoulder screw 320 to a right angle bracket 322, secured to the base 6 with a screw 324, and projects to the right, as shown in Figure 22, so that its extreme right-hand end is spring pressed against the periphery of the left end of the record drum 24 to move upwardly into a rectangular recess 326 in the edge of the drum 24 through the medium of a coiled biasing spring 328 to stop and hold the record drum 24 in a desired index position at the end of the record-ejecting operation about to be described. In this index position the first of the record-engaging sprocket teeth 22 are immediately beneath the slot 20 in housing 8 as shown in Figure 8. The record drum control mechanism operates in the manner about to be described to rotate the record drum 24 in the proper direction and the proper number of turns to eject a record sheet therefrom, and thereafter this mandrel index latch arm 318 slips into the recess 326 under the force of bias spring 328 the next time the recess 326 comes opposite latch arm 318, thus stopping rotation of the record drum 24 in the index position and holding it latched in this position for the loading of the next record. The mandrel latch-arm-freeing lever 308 just described is normally biased to rotate in a clockwise direction as shown in Figures 20 and 21 by means of a coiled bias spring 330 encircling the pivot screw 314. Thus, this lever 308 normally holds the mandrel index latch arm 318 in a downward position except when the carriage 26 is in its extreme left-hand or "record eject" position, in which position the carriage cam surface 300 depresses the forward end 306 of this lever 308 to release the mandrel latch lever 318, permitting it to rise into the recess 326 when it is opposite thereto if the remainder of the indexing mechanism is suitably conditioned to permit such movement.

Referring to Figures 16 and 21, this motion of the carriage to its extreme left-hand position also initiates operation of a rotary ratchet and cam assembly, generally indicated at 353, which operates a control switch and other lever mechanisms to cause the record drum 24 to be turned past its index position through two complete revolutions before its rotation is stopped automatically at its index position. In loading a record sheet on the machine, these two to three revolutions of the record drum insure the record sheet being firmly, smoothly and completely wrapped around the mandrel 24 before recording commences; and, in unloading a record from the machine, these two to three revolutions of the drum 24 insure the complete removal of the record sheet from the machine before the record drum is latched in indexed position ready for the next record loading operation. To accomplish these functions, a movable cam member 331 is pivoted (see Figure 16) on the back of the carriage frame 124 near the bottom thereof by means of a shouldered pivot screw 332. Referring to Figures 16, 17 and 20, this cam member 331, which is prevented from rotating in a counterclockwise direction as seen in Figure 17 by an extension 333 and a stop pin 334 projecting from the back of the carriage frame member 124, is provided with a projecting inclined-plane-like cam surface 336 along its bottom edge. Referring to Figure 20, as the carriage 26 is moved to the left, the forward end 338 of a lever 340, pivoted at its center to the vertical bracket 310 by means of a pivot screw 342, rides up on the upper side of this inclined-plane cam surface 336 of cam 331. This causes this lever 340 to be rotated in a clockwise direction, as shown in Figure 20, against the influence of a coiled bias spring 344, until its forward end 338 reaches the top of the cam surface 336 and drops off the right-hand end thereof so that the lever 340 resumes its normal position as shown in Figure 20 under the influence of its bias spring 344. This clockwise rotation of lever 340 causes its other end 346, projecting to the rear of bracket 310, to move downwardly. A pawl 348 is pivotally secured to the rearward end 346 of lever 340 and is normally biased in a counterclockwise direction by means of coiled spring 352 against the periphery of a rotary ratchet 354 forming part of the rotary ratchet and cam assembly 353. Details of this rotary ratchet 354 can best be seen by reference to the right-hand and left-hand perspective views shown in Figures 23 and 24, respectively. This rotary ratchet 354 effectively is divided longitudinally into two sections; one, the right-hand side, as viewed from the front of the machine (see Figures 22 and 23), having two diametrically opposite 60° notches 364, as can best be seen in the cross-section shown in Figure 20; and the other, the left-hand portion (see Figure 24), having six such 60° notches 366, as can best be seen in the cross-section shown in Figure 19, all of which notches have contours identical with those of notches 364, and two of which are in positions congruent to the two notches 364 of the right-hand portion of this ratchet 354. Referring to Figure 22, this ratchet 354 is rotatably mounted on a stud shaft 356, one end of which is secured by means of a threaded portion 358 and a nut 360 to a right angle plate-like bracket 362 fastened perpendicular to the base 6.

In addition to the rotary ratchet 354, the stud shaft 356 also carries two rotary cam members 368 and 370, which are keyed to a cylindrical portion 372 of the rotary ratchet 354 to rotate therewith. These cams 368 and 370 are circular except for two diametrically opposite depressions 374 on cam 368, and 376 on cam 370, with the depressions on one of these cams displaced 90° with respect to those on the other, as can be seen most readily in Figure 21. Cam 368 is of somewhat larger diameter than cam 370 and is positioned directly above and across the mandrel latching arm 318 so that, when cam 368 is in any rotatable position except that in which one of its depressions 374 is in register with this arm this cam 368 holds latching arm 318 in a depressed position so that it cannot enter the indexing recess 326 in the end of record supporting drum 24. When one of the depressions 374 in cam 368 is immediately above this arm in the position shown in Figures 21 and 22, the end of arm 318 can move into recess 326 and latch the record drum 24 in indexed position.

Referring to Figure 21, the other cam 370, operates two mechanisms, a cam follower 378 at its forward side and a rotary cam switch 380 on its opposite or rearward side. The cam follower 378 is mounted on the upper end of a leaf spring 382, the lower end of which is secured to the base 6 by screws 312, so that the cam follower 378 is biased toward cam 370. The rotary cam switch 380, having a pair of normally-open contacts 380'', is secured to the vertical bracket 362 by screws 384 and is operated by a push rod 386 which, in turn, is operated by a cam follower member 388 riding along the periphery of the cam 370 and secured to the upper end of a leaf spring 390 which, in turn, is fastened to the base 6 by screws 392. Thus, in the position shown in Figure 21, when the mandrel latching arm 318 rises into the depression 374 of cam 368, the cam followers 378 and 388 move into the depressions 376 in cam 370 under the influence of their bias springs 382 and 390, respectively, to operate portions of the automatic control and indexing mechanism as will be hereinafter described.

In order to accomplish automatically two to three successive revolutions of the record drum 24 during each record loading and record ejecting operation, for each such cycle of operation the rotary ratchet 354 must be provided with three notches on its left-hand end and one notch on its right-hand end, and the cams 368 and 370 must be provided with one depression for each of their cam followers. In the present structure, in order to simplify design of the mechanism, twice this number of depressions are provided on both portions of the ratchet 354 and the cams 368 and 370 so that this structure revolves only half a turn, i. e. 180°, during each automatic control cycle. Obviously any multiple of the necessary number of depressions could be used, if desired, with the ratchet and cam structure 353 being rotated a proportionately lesser amount during each such cycle of operation.

The rotation of this rotary cam and ratchet structure 353, comprising ratchet 354 and cams 368 and 370, throughout 120° for each two rotations of record drum 24, after its initial rotation through 60° caused by movement of the carriage 26 to its extreme left-hand position, is effected by a mechanism which can be seen most readily in Figure 19. The record drum driving pulley 78 mounted on the record drum axle 80 is provided with an indexing drive pin 394 projecting from its hub parallel to axle 80 toward the rotary ratchet and cam mechanism 353, as shown in Figures 16, 17 and 22. This pin 394 makes contact with a straight cam surface 396 of an oscillating plate-like indexing lever 398 pivoted at one end by a shoulder pivot screw 400 on the vertical bracket 362 and biased in a clockwise direction, as seen in Figure 19, toward the pin 394 by means of a coiled bias spring 402. Threaded into the upper left-hand end of vertical bracket 362 is a shouldered guide screw 401 with its head slightly overlapping the arcuate end of this oscillating lever 398 to insure its movement in a plane parallel to bracket 362. The bias spring 402 normally tends to position this indexing lever 398 so that a shoulder portion 403 above slot 415 comes to rest against the lower side of guide screw 401 as shown by the dotted line 404 in Figure 19 unless it is moved to the position shown by the full lines in Figure 19 by the drive pin 394 as the drive pulley 78 is rotated in either direction, or unless it is held in this full line position by means of a latching lever 412, hereinafter to be described. Pivoted to the lower side of this lever 398 by a pivot screw 408 is a pawl 406 which is biased into contact with the six toothed left-hand portion of the rotary ratchet 354 by means of a coil spring 410 encircling the pivot screw 408. Thus, when the lever 398 is moved downwardly by means of the pin 394, the pawl 406 causes the rotary ratchet 354 to rotate in a counterclockwise direction as seen in Figure 19 by an amount equal to the width of one of its notches, i. e. 60°. It is apparent, therefore, that this mechanism rotates the rotary ratchet 354, after its initial 60° rotation, through 60° each time the indexing drive pin 394 strikes the indexing plate lever 398, or 120° for two rotations of the drive pulley 78, and thus of the record drum 24.

*Record ejection*

Considering the operation of the mechanism just described, as soon as the carriage 26 is moved to its extreme left-hand or "record eject" position so that the end 338 of lever 340 (see Figure 20), has ascended the inclined upper face of cam 331, thus moving the other end 346 of this lever 340 in a downward direction to cause the pawl 348 mounted thereon to engage one of the ratchet notches 354 in the right-hand portion of the rotary ratchet 354, this motion causes the ratchet 354 to revolve under impetus of the pawl 348 through an angle of 60° to rotate the cams 368 and 370 from the positions shown in Figure 21 to a position 60° therefrom in a counterclockwise direction. This causes the end of the record drum indexing latch arm 318 to be moved downwardly (Figure 22) out of engagement position with respect to the end of drum 24 so as to allow the drum to be free from contact with the indexing latch arm. In addition, cam follower 388 associated with rotary cam switch 380, moves out of the depression 376 onto the higher portion of the periphery of cam 370, thus depressing switch operating push rod 386 and causing the normally-open contacts 380'' of this rotary cam switch 380 to be closed to energize the electrical circuit, hereinafter to be described, of the automatic control and indexing mechanism. At the same time, cam 276 on shaft 260 (see Figure 18), operates reversing switch 280 to open its normally-closed contacts 280' and close its normally-open contacts 280'', as above described. Through this action, the electrical circuit of the machine functions to de-energize forward solenoid 90 (see Figure 6), and to energize reverse solenoid 106, causing record drum 24 to rotate in a reverse direction, as shown by the arrow R, so that the overlapped free end of the record sheet which is wrapped around record drum 24 approaches the slot 20 in the housing 8 (see Figure 8), and passes through this slot 20 and over the shelf 18 to be ejected from the machine when the record drum 24 has revolved almost two revolutions. Thereafter the record drum 24 continues to rotate until it has completed its two to three revolutions, whereupon the rotary ratchet 354 and cams 368 and 370 will have been rotated 180° so that index latching arm 318 once more is free to rise into depression 374 of cam 368 so that it can enter recess 326 in record drum 24 the next time the drum reaches its indexing position, in which position this indexing recess 326 opposite latch arm 318, as shown in Figure 17, arrests and holds the drum in this position. Returning to Figure 21, at the same time, cam follower 388 rides into depression 376 in cam 370 to open rotary cam switch 380 and de-energize the reverse solenoid to stop the reverse drive of record drum 24.

In order to latch the oscillating indexing lever 398 in position shown in Figure 19, out of contact with the drive pin 394 when the machine is recording or reproducing, at which time there is no need for operation of the automatic control and indexing mechanism, a latching member 412 is provided passing through a slot 413 in the plate-like lever 398. During normal operation of the machine, this latch member 412 is positioned in a latching slot 415 extending to the left of the arcuate slot 413. However, when the indexing mechanism is in operation, this latching member 412 is moved to the right to the position shown by the dotted line 417 so as to permit the indexing plate 398 to oscillate up and down in the manner just described. As is shown most clearly in Figures 16 and 21, the latching member 412 is the left-hand end of an L-shaped lever 414 pivoted to rotate in a horizontal plane on top of bracket 310 about a pivot screw 416 and is provided with a depending portion 418 at its other end. Lever 414 is normally biased to rotate in a counterclockwise direction as seen in Figure 16 by means of a coiled spring 420 encircling the pivot screw 416 to hold its latching end 412 in the off-set slot 415 of the oscillating plate lever 398. This lever 414 and the cam follower 378 (see Figure 21) mounted on leaf spring 382 are so positioned with respect to each other that the forward convex surface of the cam-follower spring 382 makes contact with a rearwardly extending projection 422 on back of the L-shaped lever 414 to rotate this lever in a clockwise direction as seen in Figure 16 to move its latching end 412 (see Figure 19) from the latching slot 415 in indexing plate 398 when the cam follower 378 is moved from the depression 376 in cam 370 to the high portion of its periphery as the rotary ratchet and cam structure 353 is rotated 60° from its position shown in Figure 21 when the carriage 26 is initially moved to its extreme left-hand or "record eject" position. This unlatches the indexing plate lever 398 to permit it to oscillate in a vertical direction to rotate rotary ratchet 354 by means of pawl 406 as the record drum drive pulley 78 revolves to turn the record drum through its normal cycle of two to three revolutions for a record ejecting or loading operation.

In order to prevent the record loading plunger from being depressed while the automatic mechanism just described is functioning to eject a record from the machine and place the record drum in index position, an interlock arrangement is provided. As shown in Figures 16 and 17, this arrangement takes the form of a horizontally disposed lever 424 pivoted between its ends by a pivot screw 426 on a right-angle portion 428 of the vertical bracket 362 with its right-hand end 425 disposed in front of the depending end 418 of latching lever 414 and its left-hand end 423 immediately beneath the lower rearward corner 297 (Figure 18) of the pivoted plunger plate 296. This interlock lever 424 is normally biased in a clockwise direction to the position shown in Figure 17 by means of a coiled bias spring 432 encircling the pivot screw 426. Thus, when the rotary ratchet and cam structure 353 has been revolved 60° to initiate the cycle of automatic operations by moving cam follower 378 out of the depression 376 in cam 370 to rotate latching lever 414 in a clockwise direction as seen in Figure 16, this moves the forwardly extending end 418 of latching lever 414 in a forward direction to surmount the right-hand end 425 of this interlock lever 424 so that the latter cannot move upwardly. This makes it impossible for record loading plunger 14 to be depressed because the rearward corner 297 of plunger plate 296 cannot move the left-hand end 423 of interlock lever 424 downwardly, as shown in Figure 18, due to this interlock effect.

Record loading

After a record sheet has been ejected from the machine by reverse rotation of the record drum 24 through three complete revolutions and the drum has been stopped in its indexed position by an upward motion (Figure 22) of the right-hand end of the indexing latch arm 318 into the indexing recess 326 in the left-hand end of the drum 24 due to the operation of the automatic control and indexing mechanism just described, the machine is conditioned for the loading of another record sheet. At this time the indexing mechanism is positioned as shown in Figures 16 through 22, inclusive, with the record drum 24 positioned, as shown in Figure 8, so that the first sprocket teeth 22 are immediately beneath the slot 20 in housing 8 and the indexing latch arm 318 is in latched position in recess 326. In this condition the record loading plunger 14 may be depressed against the force of a helical biasing spring 434, which normally holds plunger plate 296 in its extreme counterclockwise position against a stop pin 435 as shown in Figure 18, because the plunger latching plate 288 is held in its uppermost position by the cam 282 on the left-hand side of the carriage and because the left-hand end 424 may be depressed due to the fact that its right-hand end 425 (Figure 21) is not prevented from rising by the forwardly extending end 418 of latching lever 414 because the cam follower 378 rests in the depression 376 of cam 370. Under these circumstances, depression of the record loading push button 14 causes the plunger plate 296 to rotate about its pivot screw 298 until its motion is arrested when its upstanding arm 294 strikes the second shoulder portion 293 of latch lever 296 while its rearward corner 297 depresses the left-hand end 423 of interlock lever 424. Because this left-hand end 423 of lever 424 is provided with an upstanding projection 436 having a rearwardly projecting cam 438, depression of plunger 14 causes this cam 438 to slide downwardly along the surface of a curved spring 440 mounted on the front face of a record-loading control switch 442 secured to the end frame member 64 by screws 443. This downward motion of cam 438 causes the spring 440 to move to the right, as shown in Figure 18, and depresses the operating push rod 444 of the control switch 442 to open its normally-closed contacts 442' and close its normally-open contacts 442". These contacts control connections in the electrical circuit, hereinafter to be described, which open the circuit to the clutch-reversing solenoid 106 (Figure 6) and close the circuit to the forward solenoid 90. In addition, referring to Figure 17, the same downward motion of end 423 of interlock lever 424 also causes the right-hand end 425 of this interlock lever 424 to move upwardly. Inasmuch as the normal position of this end 425 (see Figure 20) of lever 424 is immediately beneath the forwardly extending end 338 of the pawl-operating lever 340, this moves pawl-operating lever 340 in a clockwise direction and causes its pawl 348 to advance the rotary ratchet 354 by one notch, i. e. 60°. As in the case of the record ejection operation, the same cycle now occurs. The rotary ratchet and cam structure 353 having been moved 60°, the record drum indexing arm 318 is moved downwardly (see Figure 22) out of the indexing recess 326 by means of the cam 368 to release the record drum 24. At the same time, cam follower 378 is moved (see Figure 21) to the outer surface of cam 370 and causes the latching end 412 of latching lever 414 to move (see Figure 19) out of the latching slot 415 in the indexing plate lever 398 to release it to permit it to oscillate in conjunction with index drive pin 394 on record drum drive pulley 78 and moves the other end 418 of lever 414 forwardly underneath the upraised right-hand end 425 of interlock lever 424. This locks this lever 424 in this tilted position against the force of its coiled bias spring 432 so as to hold its left-hand end 423 in depressed position and maintain switch 442 in the position just described to keep the circuit to forward clutch solenoid 90 closed and the circuit to clutch reversing solenoid 106 open. In addition this latching of interlock lever 424 in tilted position renders record loading plunger ineffective to operate or injure any portion of the machine should it be depressed inadvertently after the automatic record loading cycle has been initiated. Simultaneously, cam follower 388 is moved (see Figure 21) to the outer surface of cam 370 closing the rotary cam switch 380 to complete the circuit to the forward solenoid 90 of the clutch mechanism. This causes the mandrel pulley 78 to drive the record mandrel 24 in its forward or clockwise direction as shown by arrow 239 in Figure 8 to cause the sprocket teeth 22 to draw the paper record sheet 2 into the machine and wrap it around the record drum 24. In order to be sure that the record sheet 2 is snugly wrapped around the drum 24 before recording commences, the mechanism is designed to rotate the record drum through the same two to three complete revolutions as in the case of the record ejection operation. During this time the rotary ratchet and cam structure 353 has revolved through 180° through the motion of plunger 14 and of the indexing drive pin 394 and oscillating plate 398 so that the drum indexing arm 318 once more moves upwardly (see Figure 22) into the recess 374 in cam 368 and therefore into the indexing recess 326 in the record drum 24 to secure it in indexed position. At the same time, cam follower 378 moves (Figure 21) into the depression 376 in cam 370 to permit the end 412 of indexing lever 414 to move (Figure 19) into the slot 415 in the indexing drive plate 398 to hold it in its depressed position. The lower edge of latching slot 415 is provided with an inclined cam surface 415' so that the driving edge 396 of drive plate 398 may be held out of contact with drive pin 394 when plate 398 is latched in this depressed position to prevent these elements from making contact during normal recording and reproducing operations. At the same time the depending end 418 of lever 414 moves from underneath the right-hand end 425 of interlock lever 424 to permit it to resume its normal position, as shown in Figure 17, under the force of its coiled bias spring 432 to move switch operating rod 444 of switch 442 to open its contacts 442" and close contacts 442' to condition the circuit for the next record ejection operation. Simultaneously, cam follower 388 moves (Figure 21) into the other depression 376 in cam 370 to open the rotary cam switch 380 and de-energize the forward clutch solenoid 90 to stop rotation of the record drum 24.

*Recording*

When the operation just described has been completed, the record sheet 2 is wrapped around the record drum 24 and the machine is ready for making a sound recording. In order to prepare it for actual recording, the carriage 26 first must be moved (see Figure 2) a short distance to the right from its extreme left-hand or "record eject" position until the recording head 122 is opposite that portion of the record sheet 2 just to the right of the left-hand sprocket teeth 22. This motion of the carriage moves the plunger plate latch cam 282 (see Figure 18) from beneath the plunger plate latch 288 so that the latter drops into latching position with its shoulder 292 to the rear of the upstanding end 294 of the plunger plate 296 to prevent the record loading plunger 14 from being depressed while the machine is recording or reproducing. Referring to Figures 20 and 21, this initial motion of the carriage to the right also moves the cam surface 300 from above the end 306 of the record drum-index-latch-locking lever 308 so that it is free to rotate in a clockwise direction as shown under the force of its bias spring 330 to move the record drum-indexing latch arm 318 (see Figure 22) downwardly out of the indexing recess 326 in the record drum 24 to release the latter for recording. Further, this initial right-hand motion of the carriage 26 causes the cam follower 272 (see Figure 19) to move off of the surface of the spiral cam 270 and thus permits the shaft 260 to rotate in a clockwise direction under the influence of its helical bias spring 266 to move the bridging fingers 264 (see Figure 8) away from the slot 255 along the face of the record drum 24 so that the recording head can engage the surface of the record sheet 2 mounted thereon. At the same time, referring to Figure 18, this clockwise motion of shaft 260 moves the cam 276 on its left-hand end away from the push rod 278 of the left-hand limit switch 280 to the position shown by the dotted line 279 to open the circuit to reverse solenoid 106 and close the circuit to the forward solenoid 90 to put the clutch-operating circuits in condition for recording and reproducing. Referring to Figures 16 and 17, the cam 331 is pivotally mounted on the back of the carriage 26 so that during this initial right-hand movement of the carriage 26, this cam is prevented, as shown in Figure 20, from being forced against the end 338 of the pawl-operating lever 340 by pivoting in a clockwise direction, as shown in Figure 17, and riding over the end 338 of lever 340 to drop into its normal position against the stop pin 334 when it has passed to the right of the end 338 of this lever 340.

When these operations have been completed, the machine is in condition for recording and reproducing. To commence recording the record-reproduce lever 32 is depressed to "record" position and, if a hand microphone is used, it is removed from its microphone hook. This closes the circuit to the motor 50 to start it rotating, and closes the circuit to the forward clutch solenoid 90 so that it is ready to operate. Thereafter, when the push switch on the microphone handle is closed, the forward clutch solenoid is energized and dictation may commence with the record drum rotating each time the microphone switch is closed during a period of dictation and stopping each time it is opened.

During the recording operation, in order to insure discontinuance of carriage travel (see Figure 2) before the recording head 122 runs off the right-hand edge of the record sheet 2, a limit switch 446 is mounted on the right-hand frame member 65. This limit switch 446 is provided with a set of normally-closed contacts operated by a push rod 447 to open the energizing circuits to the forward clutch solenoid 90 so as to disconnect the record drum from the driving motor when the carriage 26 reaches the desired limit of travel at the right-hand side of the machine. In addition, a visible or audible signal also may be provided to indicate to the dictator that this limit position has been reached so that the fully recorded record on the machine may be replaced by a fresh one. The particular carriage position at which this operation takes place is determined by the setting of a screw 448 threaded into the right-hand side of the carriage 26 and provided with a lock nut 450 to fix it firmly in its adjusted position.

Reproducing

If it is desired to listen back to any portion of the recording already made, the control lever 32 is moved to "neutral" position, the carriage 26 may be pushed to the left to the point to be reproduced, and then the control lever is moved upwardly to reengage the feedscrew and once more to place the electromagnetic head 122 against the record sheet 2. This upward motion of the control lever 32 also reverses the connection to the amplifier 51 so, thereafter, when the push switch on the microphone is closed, the microphone acts as a loud-speaker to reproduce the recorded portion. If a desk microphone and foot switch arrangement is used, a similar procedure is followed except that the microphone cradle switch and the microphone hand switch are replaced by switches in the foot control, for example, as shown in the above-mentioned Patent No. 2,374,561.

If desired, this machine also may be equipped with the usual interlocking signal arrangement which causes a buzzer or other signal to sound at all times except when the control lever 32 is depressed to condition the machine for recording, i. e. to signal whenever this lever 32 is in its "neutral" position, or when it is in its "reproduce" position but not actually reproducing, as, for example, in accordance with the disclosure of U. S. Patent No. 1,989,783 to T. H. Beard et al.

Phasing arrangement

When a record made at some earlier time is placed again on the machine for purposes of reproduction, or when a considerable period of time elapses between the recording and the reproducing of a portion of a record sheet already on the machine, it sometimes happens that the paper record sheet changes its dimensions during the intervening period of time, usually due to change in the humidity of the atmosphere. Such a dimensional change in the length of the record is unimportant because it merely alters the point of overlap where the two ends of the record meet, and only to such a small extent as to make no perceptible change in the reproduced signal. A change in the width of the record, however, i. e. longitudinally of the record drum, may cause such a lengthening or shortening of the sound track spiral as compared to the spiral groove of the feedscrew, that the reproducing head will creep ahead of or lag behind the sound track when it is traversing the record drum. Under extreme conditions this creepage actually may be of a magnitude comparable to the spacing between adjacent sound tracks. Thus, by the time the reproducing head nears the right-hand side of the machine, the reproduced signal may first decrease in volume, and then actually also reproduce the signal in the adjacent track. Finally, if permitted ot continue, it will reproduce only the signal of the sound track next to the one to be transcribed as it moves into synchronism with it.

In order to alleviate this trouble, a phasing adjustment is provided which permits the carriage 26, and therefore the recording head 122, to be advanced or retarded with respect to the record drum 24 when desired. This permits the reproducing head to be restored to its proper position with respect to the sound track being reproduced when such a creepage occurs. This minute adjustment of the relative position of the reproducing head 122 with respect to the record drum 24, and therefore the record sheet 2, is effected by means of the structure shown in Figure 25. With this arrangement, the entire feedscrew 25, and thus the head 122, is moved relative to the frame of the machine, and therefore to the record drum 24, without in any way altering or disconnecting the drive mechanism, merely by adjustment of the phasing knob 47 positioned at the right-hand end of the housing 8 as shown in Figure 1.

Referring to Figures 2, 3 and 25, the left-hand end 88 of the feedscrew 25 is slidably mounted in a bushing 454 in the end frame member 64, and its right-hand end 89 is similarly slidably mounted in a bushing 456 in the end of a U-shaped bracket 458 projecting inwardly from the right-hand end frame member 65 and fastened thereto by means of screws 460. The feedscrew 25 is biased to the right by means of a U-shaped spring 462 of suitable sheet material, which is sufficiently wide to span the feedscrew drive gear 86 and is fastened to the left-end frame member 64 by means of screws 464. This spring carries a pivot point 466 in the center of its inner face which rides in a pivot hole 468 in the center of the left-hand end 88 of feedscrew 25 and tends to press it to the right. To counter this motion, the feedscrew may be moved toward the left, in opposition to the influence of bias spring 462, by means of the phasing knob 47 which is attached to a shaft 470 which is threaded through the right-hand end frame member 65. This shaft 470 is provided with a smooth cylindrical portion 472 at its other end which passes through a guide block 474 positioned in the center of U-shaped frame 458, and its left-hand end is provided with a conical seat 476 which presses a ball bearing 478 against a similar conical seat 480 in the center of the right-hand end 89 of feedscrew 25.

By means of this structure, the feedscrew 25 may be moved longitudinally with respect to the record drum 24 by any desired amount merely by rotation of the phasing knob 47. Thus the relative position of the reproducing head 122 and the sound track 5 on a record sheet 2 may be adjusted as desired while the machine is in actual reproducing operation should the dimensions of the record sheet be altered for some reason, such as by change in the humidity, to cause a lack of synchronism between the spirals of the feedscrew and the sound track.

Electrical connections

The electrical connections of the motor 50, amplifier 51, clutch solenoids 90 and 106, the various switches 49, 280, 380, 442, 446 and 452, and other electrical elements of the machine, whereby the various automatic functions hereinbefore described are accomplished, are shown in Figure 26. The manner in which they cooperate with the mechanical elements of the machine as described above will be evident therefrom. When the main power switch 10 is closed, the indicator light 12 and the electronic amplifier unit 51 are energized. If the carriage is in its extreme left-hand or record loading position and a record sheet 2 is placed on the shelf 18 (see Figure 8) with the first of its sprocket holes 4 and 4' meshing with the first of the sprocket teeth 22 on the record drum 24, and then the record loading plunger 14 is depressed, normally-closed contacts 442' of the left-hand carriage limit switch 442 are opened to open the circuit to reverse solenoid 106, while normally-open contact 442" of this switch are closed to connect the forward solenoid 90 into the circuit. At the same time, this motion of plunger 14 rotates the rotary rachet and cam structure 353 by 60° to initiate the automatic rotation and indexing operation described above. This motion rotates cam 370 to close the normally-open contacts 380" of rotary cam switch 380 to complete the circuit from one side of the power line 11 through the normally-closed contacts 446' of right-hand limit switch 446 (closed because the carriage 26 is at the left-hand side of the machine), through the normally open contacts 280" of the control switch 280 (closed because cam 276 has been rotated by the extreme left-hand motion of carriage 26), and through the forward clutch solenoid 90 to the other side of the power supply line 11. This causes the motor 50 to drive the record drum 24 in a forward direction through three revolutions, as above-described, to wrap the record sheet 2 smoothly therearound and prepare the machine for recording. At the completion of three complete turns of the drum 24, the cam 370 has revolved through 180° to open the contacts 380' of the rotary cam switch 380, thus opening the circuit to the forward solenoid 90 and discontinuing the drive of the record drum 24. When the carriage 26 then is manually moved to its proper position to commence recording, switches 280 and 442 are returned to their normal positions opening the circuit through contacts 442" to the forward solenoid 90 and connecting it through contacts 280' of switch 280 to hand microphone push button 452 so that the machine is ready for recording. Thus, when the microphone is lifted, the microphone hook switch 49 is closed to start the motor 50. Thereafter the forward solenoid 90 is energized to rotate the record drum 24 for recording whenever the microphone hand switch 452 is closed. Recording then can continue until the carriage 26 has reached its extreme right-hand position. At that point, the right-hand limit switch 446 is opened, thus de-energizing the forward solenoid 90 and preventing further forward travel of the carriage. Thereafter, if the carriage 26 is returned to its extreme left-hand position for record ejection, switch 280 is moved to its alternate position by motion of cam 276 to close contacts 280", and rotary cam 370 moves to close contact 380" so that a circuit is completed through these two sets of contacts and through normally-closed contacts 442' of plunger switch 440 to the reverse solenoid 106 so that the motor drives the record mandrel 24 in a reverse direction to eject the record sheet 2 from the machine and the mechanisms to index position preparatory to the loading of a new record on the machine in the manner hereinbefore described.

As many possible embodiments may be made of the above invention without departing from the scope thereof, it is to be understood that all matter herein set forth or shown in the accompanying drawings is to be interpreted as illustrative only and not in a limiting sense.

We claim:

1. A sound recording and reproducing apparatus of a type arranged to operate with a paper-thin, permanent, foldable record sheet, said apparatus comprising: a machine frame, a rotatable record supporting drum mounted on the frame around which a record sheet may be cylindrically wrapped, a fastener and record-orienting arrangement on the drum for securing one end of the record sheet thereto, a record sheet holding structure disposed around the drum during sound transducing in a fixed position on the frame relative to the axis of said drum, the fastener and record-orienting arrangement and holding structure cooperating with the drum to maintain the record sheet in firm disposition on the drum during sound transducing operation, a motor and intermediate driving mechanism including a reversing clutch unit coupled to the drum for rotation thereof during sound transducing operation, the direction of drum rotation depending upon the setting of the reversing clutch unit, an electrical system arranged to supply current to the motor, a loading control means and control operable thereby which control, upon actuation of the control means, completes the drive through the clutch unit to rotate the drum in a forward direction, and a record drum position-responsive mechanism operating to declutch the clutch unit at the completion of at least one complete drum revolution following such control means actuation.

2. A sound recording and reproducing apparatus of a type arranged to operate with a paper-thin, permanent, foldable record sheet, said apparatus comprising: a record supporting assembly including a drum around which a record sheet may be cylindrically wrapped, a record sheet fastener arrangement on the drum, a recorder-reproducer carriage traversable back and forth through a path adjacent to the surface of the drum and parallel to the drum axis of rotation, a carriage responsive element which is displaced by the carriage when the carriage occupies a position at one end of its path, a motion-transferring linkage actuated by displacement of the carriage responsive element, a locking detent which is primed by actuation of the motion-transferring linkage, and an abutment-presenting portion in the record supporting assembly, the primed locking detent being moved to a locking relationship with respect to the abutment-presenting portion following displacement of the carriage responsive element, a second carriage responsive element which is displaced by the carriage when the carriage occupies a predetermined position, a second motion-transferring linkage actuated by displacement of the second carriage responsive element, an interlocking element, said interlocking element being moved by the second motion-transferring linkage so as to restrain the primed locking detent from its locking relationship with respect to the abutment presenting portion.

3. A sound recording and reproducing apparatus of a type arranged to operate with a paper-thin, permanent, foldable record sheet, said apparatus comprising: a record supporting assembly including a drum around which a record sheet may be cylindrically wrapped, a record sheet fastener and sheet-orienting arrangement on the drum, a motor and intermediate driving mechanism including a reversing clutch unit coupled to the drum for rotation thereof, the direction of drum rotation depending upon the setting of the reversing clutch unit, an electrical system arranged to supply current to the motor, a record-reproducer carriage traversable back and forth through a path adjacent to the surface of the drum and parallel to the drum axis of rotation, said motor rotating the drum surface in a forward direction past said carriage during sound transducing, a carriage responsive element which is displaced by the carriage when the carriage occupies a position at one end of its path, a switch in the electrical system actuated by displacement of the carriage responsive element, to close the clutch unit for drum rotation in the reverse direction, and a drum revolution-responsive mechanism operating to declutch the clutch unit at the completion of a fixed number of drum revolutions.

4. Apparatus of the character described and intended to operate with a flexible wrap-around sheet, said apparatus including: a machine frame, a drum mounted upon the frame for rotation about an axis, a forward and reverse drive mechanism on the frame for rotating said drum, an electrical control system for said drive mechanism including a forward switch contact and a reverse switch contact, a sheet clutching and record-orienting traction mechanism carried by the drum and adapted to hold a leading portion of a sheet against slipping with respect to the drum during rotation thereof, a cover carried upon the frame and housing the drum, an elongated sheet loading opening in the cover disposed adjacent the drum substantially parallel with the drum axis, a manual record-ejecting control means for initiating a record ejecting cycle, a motion transferring linkage between said manual means and said reverse switch contact for closing said contact to energize the drive mechanism for reverse operation for ejecting a record sheet through said loading opening, a manual record loading control means, a motion transferring linkage connected to said manual loading control means for closing said forward switch contact to energize the drive mechanism for forward rotation and a drum latching mechanism associated with the drum and operable to lock the drum in a single predetermined position against rotation following both record ejection and record loading so that when the drum is so locked, a portion of the traction mechanism is located adjacent said elongated opening.

5. A phonograph apparatus intended to operate with a flexible wrap-around record sheet, said apparatus including: a machine frame, a record drum mounted upon the frame for rotation about a fixed axis, a forward and reverse drive mechanism on the frame for rotating said drum, an electrical control system for said drive mechanism including a forward switch contact and a reverse switch contact, a record sheet clutching traction mechanism carried by the drum and adapted to hold a leading portion of a record sheet against slipping with respect to the drum during rotation thereof, a cover carried upon said frame and housing said drum, an elongated record sheet loading opening in said cover disposed adjacent the drum substantially parallel with the drum axis, a manual record-ejecting control means for initiating a record ejecting cycle, a motion transferring linkage between said manual means and said reverse switch contact for closing said contact to energize the drive mechanism for reverse operation for ejecting a record sheet through said loading opening, a manual record loading control means, a motion transferring linkage connected to said manual loading control means for closing said forward switch contact to energize the drive mechanism for forward rotation and a latch element carried upon the drum in spaced relationship from the traction mechanism, and a latching assembly disposed adjacent the drum to lock the drum in a predetermined orientation and including feeler linkage responsive to a condition of the apparatus to engage the latch element with the latching assembly following both record ejection and record loading, so that a portion of the record sheet traction mechanism is placed adjacent the loading opening when the drum is so locked.

6. Apparatus of the character described and intended to operate with a flexible wrap-around sheet, said apparatus including: a machine frame, a drum having a cylindrical surface for carrying said flexible record sheet and mounted upon the frame for rotation about an axis, a reversible drive engageable with the drum to rotate it in either forward or reverse direction, a feed mechanism, a sound translating assembly supported for motion substantially parallel to said cylindrical surface, a drive element on said assembly engageable with said feed mechanism, control mechanism on said assembly for engaging and disengaging said drive element and said feed mechanism, a cover housing the drum, a sheet loading opening in the cover disposed adjacent and along the lengthwise dimension of the drum, said rotation of said drum causing said drum surface to move past said loading opening, a sheet clutching and orienting traction mechanism carried by the drum and adapted to engage a leading portion of a sheet inserted through the loading opening, said control mechanism passing through the cover, a record loading control mechanism connected to said drive control mechanism, and an interlock mechanism connected to said loading control mechanism and controlled by said sound translating assembly to prevent the effective operation of said loading control mechanism when said drive element is engaged with said feed mechanism.

7. A phonograph apparatus intended to operate with a flexible wrap-around record sheet, said apparatus including: a machine frame, a record drum mounted upon the frame for rotation about an axis, a reversible drive mounted upon the frame and engageable with the drum to rotate it in either forward or reverse direction, a sound translating head supported for movement through a path substantially parallel to the drum axis and adjajcent the drum surface, a cover carried upon the frame and housing the drum and drive, a record sheet loading opening in the cover disposed adjacent and along the lengthwise dimension of the drum, substantially horizontal sheet guiding surface adjacent said opening, a record sheet clutching and orienting mechanism carried by the drum and adapted to engage a leading portion of a record sheet inserted through the loading opening, and a feeler mechanism at each end of the path of movement of the sound translating head and responsive to movements of the head to either end of the path to break the drive.

8. Apparatus of the character described and intended to operate with a flexible wrap-around sheet, said apparatus including: a machine frame, a drum mounted upon the frame for forward or reverse rotation about an axis, a translating element and assembly supported upon the frame for movement through a path substantially parallel to the drum axis and adjacent the drum surface, a cover carried upon the frame and housing the drum, a translating assembly clearance opening in the cover disposed adjacent said path and through which opening a part of the translating assembly moves, and a closure mechanism arranged to obstruct said clearance opening when the drum is rotated in the reverse direction.

9. Apparatus of the character described and intended to operate with a flexible wrap-around sheet, said apparatus including: a machine frame, a drum mounted upon the frame for rotation about an axis, a sheet clutching and record-orienting traction mechanism carried by the drum and adapted to hold a leading portion of a sheet upon the drum for rotation therewith, a sheet supporting structure carried upon the frame and presenting a plurality of sheet supporting surfaces each disposed snugly adjacent and closely following a portion of the surface of the drum during sound transducing in a fixed position on the frame relative to the axis of said drum, a cover carried upon the frame and housing the sheet supporting structure, a single sheet-loading opening in the cover disposed adjacent and along the lengthwise dimension of the drum through which opening a sheet may be pulled by the traction mechanism onto the drum upon forward rotation thereof, a reversible drive mechanism arranged to rotate said drum in forward or reverse direction, an electric motor in said drive mechanism, a driver driven by said motor, a clutch in said drive mechanism for controlling the direction of drum rotation, said clutch including a first wheel, means to move said wheel against said driver to condition the drive mechanism for forward rotation of the drum, a second wheel, and means to move said second wheel against the driver to condition the drive mechanism for reverse rotation of the drum, a drum-position-responsive control mechanism arranged to arrest the drum in a predetermined position with respect to said loading opening, and a manual control to condition the drive mechanism to rotate the drum in reverse direction, whereby a record sheet is ejected from the apparatus through said opening.

10. Apparatus of the character described and intended to operate with a flexible wrap-around sheet, said apparatus including: a machine frame, a drum mounted upon the frame for rotation about an axis, a translating head supported for movement through a path substantially parallel to the drum axis and adjacent the drum surface, a reversible drive mounted upon the frame and engageable with the drum to rotate it in either forward or reverse direction, a cover carried upon the frame and housing the drum and drive, a translating head clearance opening in the cover extending along the path followed by the translating head as it moves, and a closure mechanism arranged to block off the clearance opening when the drive rotates the drum in the reverse direction.

11. A phonograph apparatus intended to operate with a flexible wrap-around record sheet, said apparatus including: a machine frame, a record drum mounted upon the frame for rotation about an axis, a reversible drive mechanism mounted upon the frame and engageable with the drum to rotate it in either forward or reverse direction, a sound translating head supported for movement through a path substantially parallel the drum axis and adjacent the drum surface, said drum being rotated in a forward direction to scan the drum surface past said head, an interlock assembly associated with the drive mechanism which normally prevents reverse operation of the record drum, and a feeler responsive to a portion of the translating head in its path of movement and adapted to intercept the interlock mechanism and permit reverse operation when the translating head is in a predetermined position.

12. A phonograph apparatus intended to operate with a flexible wrap-around record sheet, said apparatus including: a machine frame, a record drum mounted upon the frame for rotation about an axis, a reversible drive mechanism mounted upon the frame and engageable with the drum to rotate it in either forward or reverse direction, a sound translating head supported for movement through a path substantially parallel to the drum axis and adjacent the drum surface, said drum being rotated in a forward direction to scan the drum surface past said head, a cover carried upon the frame and housing the drum and drive mechanism, a record loading opening in the cover disposed adjacent and along the lengthwise dimension of the drum, a record sheet clutching mechanism carried by the drum and adapted to engage the leading portion of a record sheet inserted through the loading opening, a record drum locking mechanism arranged to lock the record drum with the clutching mechanism facing the loading opening, and a control assembly interconnected with the drive and drum locking mechanisms and responsive to a position of the sound translating head in its movement along its path, said control assembly being arranged to initiate said drive mechanism to rotate the drum in a reverse direction, whereby a record sheet is ejected through said loading opening, and being arranged subsequently to actuate said drum locking mechanism.

13. A phonograph apparatus intended to operate with a flexible wrap-around record sheet, said apparatus including: a machine frame, a record drum mounted upon the frame for rotation about an axis, a reversible drive mechanism mounted upon the frame and engageable with the drum to rotate it in either forward or reverse direction, a sound translating head supported for movement through a path substantially parallel to the drum axis and adjacent the drum surface, a cover carried upon the frame and housing the drum and drive mechanism, a record loading opening in the cover disposed adjacent and along the lengthwise dimension of the drum, a record sheet clutching mechanism carried by the drum and adapted to engage the leading portion of a record sheet inserted through the loading opening, a record drum arresting mechanism arranged to arrest the record drum with the clutching mechanism facing the loading opening, a control assembly interconnected with the drive and drum arresting mechanisms, a feeler element responsive to the movement of the sound translating head into a predetermined location on its path of movement, an intermediate linkage between the feeler element and the control assembly for actuating the control assembly to reverse the direction of rotation of the record drum and thereafter arrest it with the clutching mechanism in a predetermined relationship with respect to the loading opening, and a loading control manually operable to actuate operation of the control assembly to free the record drum arresting mechanism and to cause the record drum to rotate in a forward direction a predetermined number of revolutions.

14. Apparatus of the character described and intended to operate as a dictating machine utilizing a flexible wrap-around record sheet having leading and trailing edges, said apparatus including: a machine frame, a drum mounted upon the frame for rotation about an axis, a sheet clutching and record-orienting traction mechanism carried by the drum and adapted to hold a leading portion of a sheet upon the drum for rotation of the sheet therewith, a forward-neutral-reverse drive mounted upon the frame to drive the drum in either forward or reverse direction and enable the drum to remain stationary, said drum being rotated by said drive in a forward direction to produce a scanning of a sheet thereon, a sheet supporting structure carried upon the frame and presenting a sheet supporting surface disposed snugly adjacent a portion of the surface of the drum during sound transducing in a fixed position on the frame relative to the axis of said drum, said sheet supporting structure cooperating with the sheet clutching traction mechanism and the surface of the drum to maintain the sheet in firm disposition on the drum during sound transducing operation while the drive is in forward, a record loading channel in said sheet supporting structure, a manually-operable reverse control mechanism arranged to condition the drive for reverse operation, whereby a record sheet is ejected through said loading channel, a movable cam responsive to the position of the drum and arranged to re-condition the drive to neutral when the traction mechanism is in a predetermined position with respect to said loading opening.

15. A sound recording and reproducing apparatus of a type arranged to operate with a paper-thin, foldable record sheet, said apparatus comprising: a machine frame, an element mounted upon said frame and movable through a closed path, a record supporting surface defined by said element and upon which a record sheet may be placed, a fastener and record-orienting arrangement associated with said record supporting surface for fixing one end of the record sheet relative thereto, a driving mechanism for moving said element along said path to effect scanning motion of the sheet, a sound transducing device mounted upon said machine frame and movable along a path extending substantially parallel with a portion of said record supporting surface, a feed-engaging member on said device, a feed mechanism for positively engaging said member to move the transducing device along said path, a positively-engaging mechanical coupling connected between said record supporting surface driving mechanism and said positive feed mechanism to establish a predetermined relationship between the rates of motion of said transducing device and of said element, a record sheet holding structure disposed during sound transducing in a fixed position on a frame relative to the axis of said drum and closely adjacent said record supporting element and spaced therefrom a distance approximately commensurate with the thickness of said paper-thin record sheet; the fastener arrangement and said holding structure cooperating with the record supporting element to maintain the record sheet in firm disposition with respect to the supporting surface during operation, a manual control on said transducing device connected to said feed-engaging member and operable at will to disengage said member from said feed mechanism upon actuation of said control, a record-loading control for said apparatus for initiating motion of said element, and an interlock control to prevent operation of said record-loading control when said member engages said feed mechanism, said interlock control being releasable following actuation of said manual control to allow operation of said record-loading control.

16. The invention of claim 2, wherein said interlocking element is urged by subsequent rotation of the drum subsequent to the priming of the locking detent so as to release the locking detent into a locking relationship with respect to the abutment presenting portion of the drum.

17. A sound recording and reproducing apparatus of a type arranged to operate with a paper-thin flexible record sheet, said apparatus comprising: a record supporting assembly including a drum-like structure around which a record sheet may be wrapped, a channel for the passage of a record through said assembly to said structure, a reversible drive mechanism operable to drive said structure in either a forward or a reverse direction, a record sheet fastener arrangement related to said structure, an arresting control means responsive to the position of said structure and arranged to arrest said structure with said fastener arrangement in a predetermined position with respect to said channel, a recorder-reproducer carriage traversable back and forth through a path adjacent to said structure, a positive-drive feed mechanism for positively feeding said recorder-reproducer carriage in at least one direction along said path, said feed mechanism including a feedscrew connected to a portion of said reversible drive mechanism to drive said feed mechanism from motion derived from said portion of said reversible drive mechanism and a feedscrew-engaging element movable on said carriage between engaged and disengaged positions, and control mechanism interconnected with said feed screw-engaging element and operable at will to disengage said element from the feed screw and thereafter to cause said reversible drive mechanism to condition itself for driving said structure in reverse direction to eject the sheet from said record supporting assembly.

18. A dictating machine of a type intended for use with a flexible, rectangular record sheet having a recording surface thereon and of a type designed to receive the sheet when inserted therein and to curve the sheet to form a geometrically cylindrical surface upon which a sound track can be recorded, said apparatus comprising: a machine frame, a record supporting structure having record supporting elements defining a closed unobstructed geometrically cylindrical record pathway for receiving the record sheet when it is inserted and for curving the record sheet so that its recording surface presents a substantially closed geometrically cylindrical surface upon which a substantially continuous sound track can be recorded, a movable holding element for moving said sheet into said pathway and for moving said sheet in forward or reverse direction therein and for moving said sheet from said pathway, a cover mounted upon said frame and housing said record supporting structure, a sheet-loading opening in said cover, a guiding surface associated with said cover and with said opening for guiding a sheet through said opening into said record pathway, a forward-neutral-reverse drive mechanism for moving said movable holding element in forward or reverse direction, a carriage movably mounted upon said frame and carrying a sound transducing unit mounted thereon, said carriage being movably mounted upon the frame for motion along a path adjacent a portion of said record pathway whereby the transducing unit carried thereon can be moved in a scanning relationship with the record surface of a record in said pathway to produce sound tracks upon said record surface, a positive carriage feed mechanism for feeding said carriage in at least one direction along said pathway, a positive-drive mechanical linkage connected between a portion of said forward-neutral-reverse drive mechanism and said carriage feed mechanism to establish a predetermined relationship between the rates of motion of said feed mechanism and said movable holding element whereby the sound tracks produced upon said record surface by the scanning of said unit have a predetermined spacing therebetween, a reverse drive-mechanism control operable to place said drive mechanism in reverse for ejecting a record from said pathway, through said opening and along said guiding structure, a holding element arresting mechanism to arrest said movable holding element in a predetermined position relative to said opening, a loading control mechanism interconnected with said reverse drive mechanism control to prevent operation of the loading control mechanism when said drive mechanism is in reverse and operable to place said drive mechanism in forward for driving said movable holding element to move a sheet through said opening into said pathway, said arresting mechanism arresting said holding element in a predetermined position relative to said opening following record ejection and following record loading.

19. A sound recording and reproducing apparatus of a type arranged to operate with a paper-thin, foldable record sheet, said apparatus comprising: a machine frame, a record supporting surface movably mounted thereupon upon which a record sheet may be wrapped, a housing on the frame covering said surface, a loading opening in the housing through which a record sheet may be passed to or taken from said surface, a clearance slot in the housing extending along a portion of said surface, a sound transducing assembly part of which passes through said clearance slot, and a slot-blocking mechanism movable into slot-blocking relationship across the clearance slot.

20. In a sound recording and reproducing machine of a type adapted to use a flexible sheet record, a record-supporting structure defining a record pathway and presenting a record supporting surface, a plurality of aligned record-driving and orienting elements for orienting a sheet record in said pathway and driving it therealong, a drive mechanism coupled thereto, an electric motor in the drive mechanism, an electrically-actuated reversing clutch in the drive mechanism and arranged to reverse the driving elements to eject a sheet from said pathway, at least one record guide member presenting surfaces constraining a record in said pathway in smooth disposition upon said supporting surface irrespective of changes in the dimensions of the sheet, said guide members defining a transducing clearance opening extending transversely of said pathway, a transducing assembly guide member, a sound transducing assembly traversable along said transducer guide adjacent said opening in scanning relationship with a record in said record pathway, a switch arranged to energize said clutch for reverse operation, a manual control arranged to close said switch to initiate reverse operation of the record-driving elements, and an interlock control responsive to motion of said record-driving elements to open said switch following the ejection of a record sheet.

21. The apparatus of claim 20, wherein the transducing assembly guide member extends into a lateral end zone, said transducing assembly being traversable into said end zone out of scanning relationship with a record in said record pathway, and including a feeler element in said end zone responsive to motion of the assembly along said transducer guide into said end zone, said switch being responsive to actuation of said feeler element to energize the reversing clutch.

22. The apparatus of claim 21, including a second element responsive to the position of the record-driving elements, second switch means connected to said drive mechanism to condition it for forward operation, and a loading interlock control actuated by said second feeler element to close said second switch means.

23. Sound recording or reproducing apparatus of a type arranged to operate with a flexible wrap-around sheet, said apparatus including: a machine frame, a record supporting structure mounted on the frame and having surface portions defining portions of a closed record path in which a record sheet may be wrapped with its trailing edge adjacent its leading edge, a sound translating member supported for movement through a scanning path adjacent the record path in scanning relationship with a record in said record path and being movable into a terminal zone, a sheet traction element associated with the record-supporting structure and adapted to move a sheet along the record path, a reversible drive mechanism including a motor for driving said element, and a control mechanism connected to said reversible drive and responsive to the presence of said translating member in said terminal zone to actuate said drive in reverse to eject a record from the record path.

24. Sound recording or reproducing apparatus arranged to operate with a flexible wrap-around sheet, said apparatus including: a machine frame, a record-supporting structure mounted on the frame and having surface portions defining portions of a closed record path in which a record sheet may be wrapped with its trailing edge adjacent its leading edge, a translating member movable into and out of scanning relationship with a record in the record path, a sheet traction element adapted to hold a leading portion of a sheet to move it along the record path, a reversible drive mechanism having forward and reverse conditions of operation and arranged to drive said element, a reverse drive control arranged to condition said drive mechanism for reverse operation, a manual control operable at will to actuate said drive mechanism into reverse condition to eject a record sheet from the record path, and an interlock control to prevent said reverse operation when the translating member is in said scanning relationship.

25. Sound recording or reproducing apparatus of a type arranged to operate with a flexible wrap-around sheet, said apparatus including: a machine frame, a record-supporting structure mounted on the frame and having surface portions defining portions of a closed record path in which a record sheet may be wrapped with its trailing edge adjacent its leading edge, a sound translating member supported for movement through a scanning path adjacent the record path in scanning relationship with a record in said record path and movable into and out of scanning relationship, a sheet driving element associated with the record-supporting structure and adapted to move a sheet along the record path, a reversible drive mechanism including a motor for driving said element, a clutch mechanism coupled to said motor and including a revolving driver driven by said motor, a first rotatable wheel in said clutch, means for holding said wheel against said driver to move said sheet driving element in a forward direction, a second rotatable wheel in said clutch, an electro-motive mechanism arranged when energized to move said second wheel against said driver to drive said element in a reverse direction to eject a sheet from the record path, a switch for energizing said electro-motive mechanism, and a manual control operable at will to move said member out of scanning relationship and to actuate said switch.

26. Sound recording or reproducing apparatus arranged to operate with a flexible wrap-around sheet, said apparatus including: a machine frame, a record-supporting structure mounted on the frame and having surface portions defining portions of a closed record path in which a record sheet may be wrapped with its trailing edge adjacent its leading edge, a sound translating member supported for movement through a scanning path adjacent the record path in scanning relationship with a record in said record path and being movable into an end zone removed from said record path, a drive mechanism adapted to be conditioned for forward or reverse operation, a sheet traction element connectable to said drive mechanism and associated with the record-supporting structure and adapted to grip a sheet to move it along the record path, a record-sheet-confining srtucture disposed around the record-supporting structure during sound translating in a fixed position relative to the frame; the traction mechanism and confining structure co-operating with the supporting structure to maintain the record sheet smoothly wrapped in the record path irrespective of changes in the dimensions of the sheet, a passageway through said record confining structure, and a drive control connected to said reversible drive and operative to condition the drive mechanism either for forward or reverse operation, said drive control being responsive to the presence of said translating element in said end zone to condition said drive mechanism for reverse operation and being responsive to movement of said translating assembly out of said end zone to condition the drive mechanism for forward operation.

27. A sound recording and reproducing apparatus of a type arranged to operate with a foldable record sheet, said apparatus comprising: a machine frame, a record supporting surface movably mounted thereupon upon which a record sheet may be wrapped, a housing on the frame covering said surface, a loading opening in the housing through which a record sheet may be passed to or taken from said surface, a clearance slot in the housing extending along a portion of said surface, a sound transducing assembly movable along a path, a first portion of the path being adjacent said clearance slot and a second portion thereof being in a lateral zone removed from said clearance slot, whereby when said assembly is in the first portion of its path it is in scanning relationship with said surface and when in the lateral zone it is removed from scanning relationship, a control element arranged to be actuated by the presence of said assembly in the lateral zone, and a slot-blocking mechanism responsive to actuation of said control element to move into slot-blocking relationship across the clearance slot.

28. A dictating machine of a type intended for use with a flexible, rectangular record sheet having a recording surface thereon and of a type designed to receive the sheet when inserted therein and to curve the sheet to form a substantially closed surface upon which a sound track can be recorded, said apparatus comprising: a machine frame, a record supporting structure having record supporting elements defining a closed unobstructed record pathway for receiving the record sheet when it is inserted and for curving the record sheet so that its recording surface presents a substantially closed surface upon which a substantially continuous sound track can be recorded, a movable holding element for moving said sheet into said pathway and for moving said sheet in forward or reverse direction therein and for moving said sheet from said pathway, a cover mounted upon said frame and housing said record supporting structure, a sheet-loading opening in said cover, a guiding surface associated with said cover and with said opening for guiding a sheet through said opening into said record pathway, a forward-neutral-reverse drive mechanism for moving said movable holding element in forward or reverse direction, a carriage movably mounted upon said frame and carrying a sound transducing unit mounted thereon, said carriage being movably mounted upon the frame for motion along a path adjacent a portion of said record pathway whereby the transducing unit carried thereon can be moved in a scanning relationship with the record surface of a record in said pathway to produce sound tracks upon said record surface, a positive carriage feed mechanism for feeding said carriage in at least one direction along said pathway, a positive-drive mechanical linkage connected between a portion of said forward-neutral-reverse drive mechanism and said carriage feed mechanism to establish a predetermined relationship between the rates of motion of said feed mechanism and said movable holding element whereby the sound tracks produced upon said record surface by the scanning of said unit have a predetermined spacing therebetween, a reverse drive mechanism control operable to place said drive mechanism in reverse for ejecting a record from said pathway through said opening and along said guiding structure, a holding element arresting mechanism to arrest said movable holding element in a predetermined position relative to said opening, and a loading control mechanism interconnected with said reverse drive mechanism control to prevent operation of the loading control mechanism when said drive mechanism is in reverse and operable to place said drive mechanism in forward for driving said movable holding element to move a sheet through said opening into said pathway, said arresting mechanism arresting said holding element in a predetermined position relative to said opening following record ejection.

29. A phonograph apparatus intended to operate with a flexible wrap-around record sheet, said apparatus including: a machine frame, a record-supporting structure mounted upon the frame and having surface portions defining portions of a closed record path, said structure arranged to revolve with respect to the frame, an electrically operated reversible drive mechanism mounted upon the frame and engageable with the record-supporting structure to revolve it in either forward or reverse direction, a sound translating head supported for movement through a path adjacent the record path, a cover carried upon the frame and housing the record-supporting structure and drive mechanism, a record loading opening in the cover disposed adjacent the record path, a record sheet clutching element carried by the record-supporting structure and adapted to engage the leading portion of a record sheet inserted through the loading opening, an arresting mechanism for said record-supporting structure arranged to arrest the structure in a predetermined position with the clutching element near the loading opening, a control assembly interconnected with the drive to actuate it for reverse operation and also interconnected with the arresting mechanism, a switch in said control assembly arranged to de-energize the drive mechanism, a first contact in said switch, a second movable contact associated with said first contact, and a member responsive to the position of the record-supporting structure, said second contact being controlled by the member to open said switch and de-energize the drive mechanism, a feeler element responsive to the movement of the sound translating head into a predetermined location on its path of movement, an intermediate coupling between the feeler element and the control assembly for actuating the control assembly to reverse the direction of revolution of the record-supporting structure, whereby the member thereafter opens said switch and said control assembly thereafter actuates the arresting mechanism to arrest the record-supporting structure with the clutching element in said predetermined position, and a loading control manually operable to actuate operation of the control assembly to free the record-supporting structure and to cause it to revolve in a forward direction.

30. Sound recording or reproducing apparatus arranged to operate with a flexible wrap-around sheet, said apparatus including: a machine frame, a record-supporting structure mounted on the frame and having surface portions defining portions of a closed record path in which a record sheet may be wrapped with its trailing edge adjacent its leading edge, a translating member movable into and out of scanning relationship with a record in the record path, a sheet traction element adapted to hold a leading portion of a sheet to move it along the record path, a reversible drive mechanism having forward and reverse conditions of operation and arranged to drive said element, means in said reversible drive to actuate it for reverse operation, a manual control operable at will, said means being responsive to said manual control, and a time-delay mechanism arranged to measure approximately the length of time said drive is in reverse condition and to release said means after an elapse of an approximately predetermined length of time.

31. A sound recording or reproducing apparatus of a type adapted to utilize a paper-thin, foldable record sheet, said apparatus comprising: a sheet record supporting structure defining a record path around which a record may be wrapped with its trailing edge adjacent its leading edge, a record sheet orienting and coupling arrangement associated with the sheet supporting structure and including two spaced record coupling elements disposed to couple the record sheet near its leading edge to the sheet supporting structure for movement therewith during recording or reproducing to permit smooth disposition of the record sheet irrespective of dimensional changes therein, a record sheet sustaining organization distributed at points around the endless record path and acting cooperatively with portions of the sheet supporting structure to maintain the sheet smoothly spread thereupon during sound recording or reproducing, and a carriage traversable along a path adjacent said record path, a transducer head mounted on said carriage to raise away from the record path, a member on said carriage movable between first and second positions, a cam on said member arranged when in the second position to raise the head from the record path, a manual control operable at will to actuate said member to its second position, a loading control for permitting loading of a sheet into the record path, and an interlock control to prevent operation of the loading control until said manual control is operated.

References Cited in the file of this patent
UNITED STATES PATENTS

| | | |
|---|---|---|
| 857,974 | Bancroft | June 25, 1907 |
| 1,075,496 | Robinson | Oct. 14, 1913 |
| 2,043,769 | Norton | June 9, 1936 |
| 2,043,884 | Crudo | June 9, 1936 |
| 2,049,169 | Finch | July 28, 1936 |
| 2,180,091 | Norton et al. | Nov. 14, 1939 |
| 2,200,574 | Davis | May 14, 1940 |
| 2,216,608 | Anderson | Oct. 1, 1940 |
| 2,301,886 | La Forest | Nov. 10, 1942 |
| 2,320,572 | Dann | June 1, 1943 |
| 2,323,066 | May | June 29, 1943 |
| 2,328,597 | Woolf | Sept. 7, 1943 |
| 2,356,851 | Huenlich | Aug. 29, 1944 |
| 2,364,545 | Nell | Dec. 5, 1944 |
| 2,380,754 | Hardy | July 31, 1945 |
| 2,417,651 | Kuhlik | Mar. 18, 1947 |
| 2,431,360 | Philpott | Nov. 25, 1947 |
| 2,435,260 | Wise et al. | Feb. 3, 1948 |
| 2,463,513 | Brubaker | Mar. 8, 1949 |
| 2,530,029 | Pond | Nov. 14, 1950 |
| 2,581,499 | Roberts | Jan. 8, 1952 |